United States Patent
Ishizawa et al.

(10) Patent No.: US 9,085,113 B2
(45) Date of Patent: Jul. 21, 2015

(54) METHOD FOR MANUFACTURING LIQUID CONTAINER, AND LIQUID CONTAINER

(71) Applicant: Seiko Epson Corporation, Tokyo (JP)

(72) Inventors: Taku Ishizawa, Nagano-ken (JP); Hiroyuki Kawate, Yamanashi-ken (JP); Hiroshi Nose, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 141 days.

(21) Appl. No.: 14/014,843

(22) Filed: Aug. 30, 2013

(65) Prior Publication Data

US 2014/0061961 A1 Mar. 6, 2014

(30) Foreign Application Priority Data

Aug. 31, 2012 (JP) ................................. 2012-191473
Sep. 27, 2012 (JP) ................................. 2012-213718

(51) Int. Cl.
*B29D 22/00* (2006.01)
*B41J 2/175* (2006.01)

(52) U.S. Cl.
CPC ........... *B29D 22/003* (2013.01); *B41J 2/17506* (2013.01); *B41J 2/17513* (2013.01); *B41J 2/17559* (2013.01)

(58) Field of Classification Search
CPC ................................................... B29D 22/003
See application file for complete search history.

(56) References Cited

U.S. PATENT DOCUMENTS

| 5,929,885 | A * | 7/1999 | Nakajima et al. ................ 347/87 |
| 6,296,354 | B1 * | 10/2001 | Hashimoto ...................... 347/87 |
| 2008/0036833 | A1 | 2/2008 | Shinada et al. |
| 2009/0237473 | A1 | 9/2009 | Miyajima et al. |
| 2009/0322832 | A1 | 12/2009 | Wanibe et al. |
| 2009/0322838 | A1 | 12/2009 | Wanibe et al. |
| 2009/0322839 | A1 | 12/2009 | Ishizawa et al. |
| 2010/0073438 | A1 | 3/2010 | Wanibe et al. |
| 2013/0083137 | A1 * | 4/2013 | Murphy et al. .................. 347/85 |

FOREIGN PATENT DOCUMENTS

| JP | 2009-226687 | 10/2009 |
| JP | 2009-298159 | 12/2009 |
| JP | 2010-005958 | 1/2010 |

* cited by examiner

*Primary Examiner* — Jill Heitbrink

(57) ABSTRACT

A method for manufacturing a liquid container, the liquid container including: a case having a containing section for containing liquid; a supply port for supplying the liquid from the containing section to the outside thereof; and a detection member for detecting an amount of the liquid in the containing section, wherein the containing section is divided into a first containing chamber, a second containing chamber, a third containing chamber and a fourth containing chamber in a flow of the liquid from the containing section to the supply port, the method comprising: forming an injection port on an upstream part of the flow from the fourth containing chamber, the injection port being communicated with the inside of the containing section; and injecting the liquid from the injection port.

17 Claims, 17 Drawing Sheets

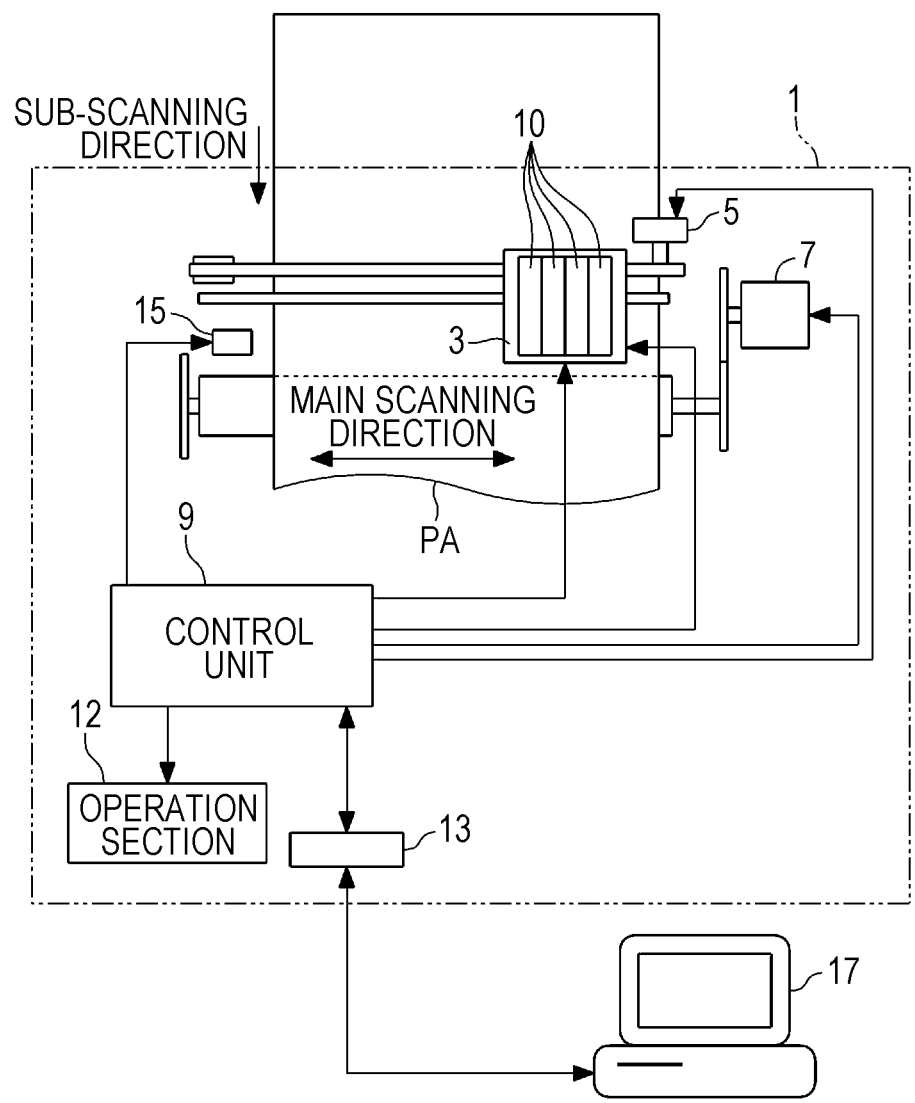

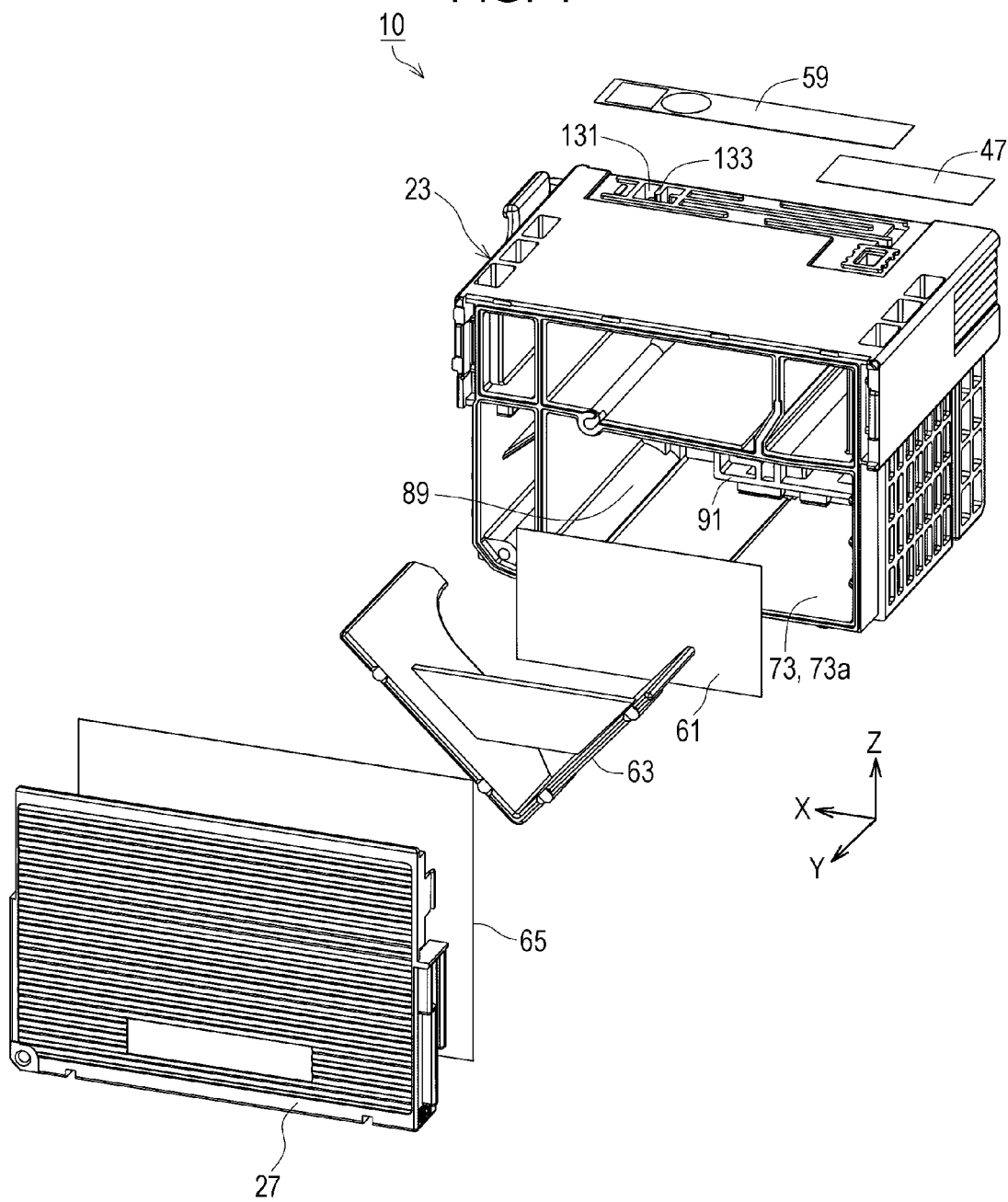

METHOD FOR MANUFACTURING LIQUID CONTAINER, AND LIQUID CONTAINER

CROSS-REFERENCE TO RELATED APPLICATIONS

This application claims priority to Japanese Patent Application No. 2012-191473 filed on Aug. 31, 2012, and Japanese Patent Application No. 2012-213718 filed on Sep. 27, 2012. The entire disclosures of Japanese Patent Application Nos. 2012-191473 and 2012-213718 are hereby incorporated herein by reference.

BACKGROUND

1. Technical Field

The present invention relates to a method for manufacturing a liquid container, and a liquid container.

2. Related Art

In the related art, as a technique for supplying ink to a printer that is an example of a liquid ejecting apparatus, a technique using an ink cartridge (also simply referred to as "a cartridge") has been known. The cartridge is manufactured with the ink injected thereto. The cartridge mounted on the printer supplies the ink inside to the printer via a supply port. In the related art, the cartridge is replaced with a new one when the ink gets consumed and a remaining amount of the ink inside becomes zero or a small amount. In addition, the cartridge may be re-manufactured by re-injecting the ink into the used cartridge. In the related art, the cartridge may include a detection member (for example, a piezoelectric element or a prism. Also it is referred to as a first member) which can be used to detect a state of remaining amount of ink (presence or absence of a remaining amount of the ink or the remaining amount of the ink) (see, for example, JP-A-2010-5958).

However, in order to increase an ink amount in the cartridge, it is conceivable to increase the volume of the containing section in which the ink is contained in the cartridge. As a method of increasing the volume of the containing section, for example, a method of widening the area of the containing section in a direction intersecting a vertical direction in a use state of the cartridge is exemplified. Therefore, it is possible to avoid that the cartridge protrudes in the vertical direction. However, when the area of the containing section is widened in the direction intersecting the vertical direction, detection accuracy in detecting the remaining amount of the ink tends to deteriorate easily. This is because a level of a liquid surface of the ink in the cartridge, in which the volume of the containing section is large, is lower than that in the cartridge, in which the volume of the containing section is small, even though the remaining amounts of the ink are the same in both cases.

To deal with such a thing, it is conceivable to divide the cartridge into small rooms of which the capacity is smaller than that of the containing section and to provide the detection member in the small room. If such small rooms are provided, it is easy to keep the liquid surface in the small room at a high level even if the remaining amount of the ink is small. Thus, it is possible to avoid deterioration of the detection accuracy in detecting the remaining amount of the ink. As a method for injecting the ink with respect to the cartridge having such a configuration, a method is conceivable in which the ink is injected from the small room. However, when the ink is injected from the small room, air bubbles may be mixed into the small room. If the air bubbles are mixed into the small room, the air bubbles are adhered to the detection member. As a result, there is a problem that the detection accuracy in detecting the remaining amount of the ink is easy to deteriorate. Such a problem is not limited to the cartridge in which the ink is contained and the problem is common even in a liquid container which contains liquid other than the ink.

SUMMARY

The invention can be realized in the following forms or application examples.

Application Example 1

According to this application example, there is provided a method for manufacturing a liquid container, the liquid container including: a case having a containing section for containing liquid; a supply port for supplying the liquid from the containing section to the outside thereof; and a detection member for detecting an amount of the liquid in the containing section, wherein the containing section is divided into a first containing chamber, a second containing chamber, a third containing chamber and a fourth containing chamber in a flow of the liquid from the containing section to the supply port, the first containing chamber which is provided for containing the liquid, the second containing chamber which is provided on a downstream part of the flow from the first containing chamber and communicates with the first containing chamber, the third containing chamber which is provided on a downstream part of the flow from the second containing chamber and communicates with the second containing chamber, and the fourth containing chamber which is provided on a downstream part of the flow from the third containing chamber and communicates with the third containing chamber, the fourth containing chamber being partitioned from the third containing chamber with a first sheet member, the detection member being located in the fourth containing chamber, the method comprising: forming an injection port on an upstream part of the flow from the fourth containing chamber, the injection port being communicated with the inside of the containing section; and injecting the liquid from the injection port.

In this case, since the liquid is injected into the containing section from the injection port formed on the upstream part from the fourth containing chamber in which the detection member is provided, it is easy to avoid that the air bubbles are mixed into the fourth containing chamber when the liquid is injected. Thus, it is easy to suppress that the air bubbles are adhered to the detection member. Accordingly, it is easy to avoid deterioration of the accuracy in detecting the liquid amount.

Application Example 2

In the method for manufacturing the liquid container according to the application example, the case including a first outer wall, an opening section being formed in a first outer wall of the case, the opening section being opened from the outside of the case toward the inside of the fourth containing chamber, the detection member having light transmission property and protruding from the opening section into the fourth containing chamber in a state where the opening section is covered by the detection member from the outside of the case, a flow path communicating between the third containing chamber and the fourth containing chamber, the flow path including a first outer wall flow path which is provided on the first outer wall, the first outer wall flow path being sealed from the outside of the case with a second sheet member having the light transmission property, the injection port being formed in the second sheet member in the first outer wall flow path in the process of forming an injection port of the method.

In this case, the liquid can be injected from the first outer wall side, in which the detection member having the light transmission property is provided, into the containing section via the first outer wall flow path. Therefore, the state of injection of the liquid via the detection member can be visually recognized when the liquid is injected.

Application Example 3

In the method for manufacturing the liquid container according to the application example, a bending section being provided in the flow path, the bending section communicating between the first outer wall flow path and the fourth containing chamber, wherein forming the injection port including forming the injection port between the first outer wall flow path and the bending section.

In this case, at least a portion of the liquid injected from the first outer wall flow path reaches the inside of the containing section via the bending section. In a case where the air bubbles are mixed into the injected liquid, the air bubbles are easy to be caught in the bending section when the liquid passes through the bending section. Therefore, it is easier to avoid mixing of the air bubbles into the fourth containing chamber.

Application Example 4

In the method for manufacturing the liquid container according to the application example, the third containing chamber having the largest volume among the first containing chamber, the second containing chamber, the third containing chamber and the fourth containing chamber, wherein forming the injection port including forming the injection port in the third containing chamber.

In this case, since the liquid can be injected from the third containing chamber having the largest volume among the first containing chamber, the second containing chamber, the third containing chamber and the fourth containing chamber, the liquid can be effectively injected into the containing section.

Application Example 5

In the method for manufacturing the liquid container according to the application example, wherein forming the injection port including forming the injection port in the outside of a region overlapping the fourth containing chamber.

In this case, the liquid can be injected so as to avoid the region overlapping the fourth containing chamber when the liquid is injected from the third containing chamber. Therefore, when the liquid is injected, it is easy to avoid the damage to the fourth containing chamber.

Application Example 6

In the method for manufacturing the liquid container according to the application example, wherein forming the injection port including forming the injection port in a flow path communicating between the third containing chamber and the second containing chamber.

In this case, since the liquid can be injected into the flow path communicating between the third containing chamber and the second containing chamber, it is possible to inject the liquid to both the third containing chamber and the second containing chamber at the same time.

Application Example 7

In the method for manufacturing the liquid container according to the application example, the flow path including a second outer wall flow path that is provided on the second outer wall of the case, the second outer wall flow path being sealed from the outside of the liquid container with a third sheet member, wherein forming the injection port including forming the injection port in the third sheet member.

In this case, since the injection port is formed in the third sheet member, it is possible to avoid forming of the injection port in the case.

Application Example 8

In the method for manufacturing the liquid container according to the application example, wherein forming the injection port including forming the injection port in the second containing chamber.

In this case, since the liquid can be injected from the second containing chamber between the first containing chamber and the third containing chamber, it is possible to inject the liquid efficiently to both the first containing chamber and the third containing chamber.

Application Example 9

In the method for manufacturing the liquid container according to the application example, a flow path communicating between the second containing chamber and the first containing chamber, the flow path including a third outer wall flow path provided on the second outer wall of the case, the third outer wall flow path being sealed with the third sheet member, wherein forming the injection port including forming the injection port in the third sheet member.

In this case, since the liquid can be injected from the third outer wall flow path included in the flow path between the second containing chamber and the first containing chamber, it is possible to inject the liquid in both the second containing chamber and the first containing chamber at the same time.

Application Example 10

In the method for manufacturing the liquid container according to the application example, the containing section including: a partition wall which partitions the second containing chamber and the first containing chamber; and a rib which is opposite to the partition wall in a position spaced apart from the partition wall in the first containing chamber, wherein forming the injection port including forming the injection port between the partition wall and the rib.

In this case, since the injection port is formed between the partition wall and the rib, it is possible to reduce the deflection caused to the case when forming the injection port.

Application Example 11

In the method for manufacturing the liquid container according to the application example, the containing section including: a partition wall which partitions the second containing chamber and the first containing chamber; and a rib which is opposite to the partition wall in a position spaced apart from the partition wall in the first containing chamber, wherein forming the injection port including forming the injection port in a side of the rib opposite to the partition wall.

In this case, since the liquid can be injected from the side of the rib opposite to the partition wall into the first containing section, even though the air bubbles are mixed into the injected liquid, the air bubbles are easy to be caught in the rib. Therefore, it is easier to avoid mixing of the air bubbles into the fourth containing chamber.

Application Example 12

In the method for manufacturing the liquid container according to the application example, the case including: an air communication chamber which makes the first containing chamber communicate with the outside of the case via an air opening hole provided in the case, the air communication chamber being provided on an upstream part of the flow from the first containing chamber, wherein forming the injection port including forming the injection port on the upstream part of the flow from the first containing chamber.

In this case, since the liquid can be injected from the upstream part of the flow from the first containing chamber into the containing section, the air bubbles are difficult to reach the fourth containing chamber even though the air bubbles are mixed into the injected liquid.

Application Example 13

In the method for manufacturing the liquid container according to the application example, a flow path communicating between the air communication chamber and the first containing chamber, the flow path including a fourth outer wall flow path that is provided on the second outer wall of the case, the fourth outer wall flow path being sealed with the third sheet member, wherein forming the injection port including forming the injection port in the third sheet member.

In this case, since the injection port is formed in the third sheet member which seals the fourth outer wall flow path, it is possible to avoid forming of the injection port in the case.

Application Example 14

In the method for manufacturing the liquid container according to the application example, wherein forming the injection port including forming the injection port in the air communication chamber.

In this case, since the liquid can be injected from the air communication chamber on the upstream part of the flow from the first containing chamber into the containing section, the air bubbles are further difficult to reach the fourth containing chamber even though the air bubbles are mixed into the injected liquid.

Application Example 15

In the method for manufacturing the liquid container according to the application example, the case including: a second air communication chamber communicating respectively with the fourth outer wall flow path and the first containing chamber, the second air communication chamber being provided between the fourth outer wall flow path and the first containing chamber, wherein forming the injection port including forming the injection port on the upstream part of the flow from the first containing chamber and the downstream part of the flow from the fourth outer wall flow path.

In this case, since the liquid can be injected from the upstream part of the flow from the first containing chamber into the containing section, the air bubbles are difficult to reach the fourth containing chamber even though the air bubbles are mixed into the injected liquid.

Application Example 16

In the method for manufacturing the liquid container according to the application example, a flow path communicating between the second air communication chamber and the first containing chamber, the flow path including a fifth outer wall flow path provided on the second outer wall of the case, the fifth outer wall flow path being sealed with the third sheet section, wherein forming the injection port including forming the injection port in the third sheet member.

In this case, since the injection port is formed in the third sheet member which seals the fifth outer wall flow path, it is possible to avoid forming of the injection port in the case.

Application Example 17

In the method for manufacturing the liquid container according to the application example, wherein forming the injection port including forming the injection port in the second air communication chamber.

In this case, since the liquid can be injected from the second air communication chamber on the upstream part of the flow from the first containing chamber into the containing section, the air bubbles are difficult to reach the fourth containing chamber even though the air bubbles are mixed into the injected liquid.

Application Example 18

According to this application example, there is provided a liquid container which is manufactured by the method for manufacturing the liquid container described above.

In this case, the liquid container of the Application Example is manufactured by the manufacturing method in which the air bubbles are difficult to be mixed into the fourth containing chamber. Thus, it is easy to suppress adhering of the air bubbles to the detection member in the liquid container. Accordingly, it is easy to avoid deterioration of the accuracy in detecting the liquid amount.

BRIEF DESCRIPTION OF THE DRAWINGS

The invention will be described with reference to the accompanying drawings, wherein like numbers reference like elements.

FIG. 1 is a view illustrating a schematic configuration of a liquid ejecting system in an embodiment.

FIG. 4 is an exploded perspective view of the cartridge in the embodiment.

DESCRIPTION OF EXEMPLARY EMBODIMENTS

Figure 2A:
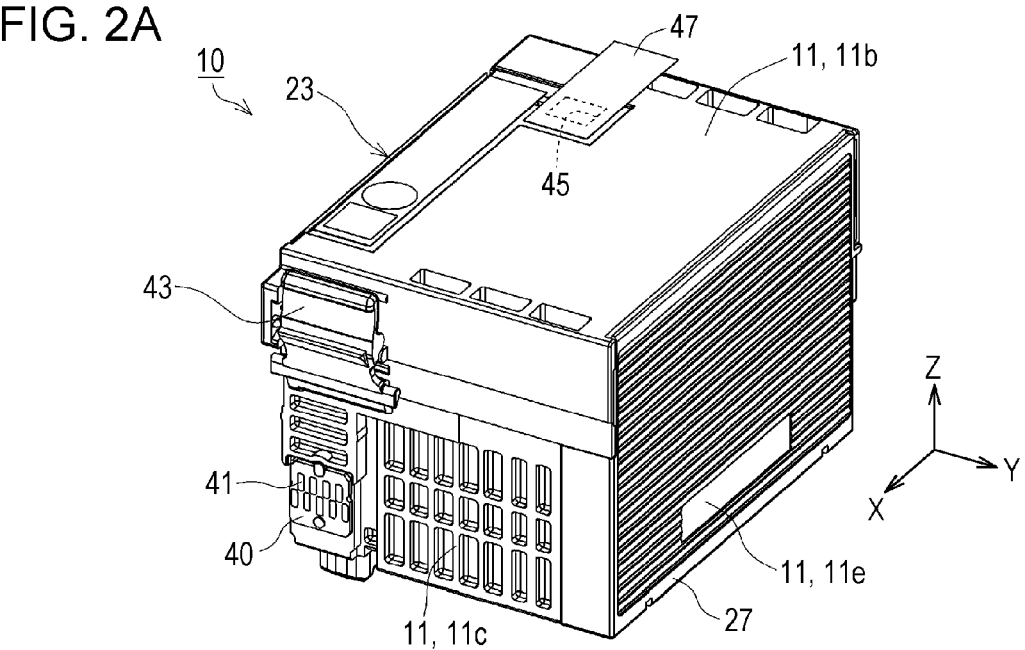
FIGS. 2A and 2B are perspective views illustrating exteriors of a cartridge in the embodiment.

As an example, an embodiment of a liquid ejecting system will be described with reference to the drawings. In addition, in each of the drawings, in order to make the size of each configuration to a recognizable degree, the configuration or the member may have a different scale.

Configuration of Liquid Ejecting System

As illustrated in FIG. 1, a liquid ejecting system 1000 has a printer 1 that is an example of a liquid ejecting apparatus and a cartridge 10 that is an example of a liquid container which contains an ink as the liquid. The printer 1 is an ink jet type printing apparatus which performs printing on a printing paper PA by ejecting the ink toward the printing paper PA from a printing head. The printer 1 has a holder 3, a first motor 5, a second motor 7, a control unit 9, an operation section 12, an interface 13 and a detection device 15.

The holder 3 includes the printing head (not illustrated) ejecting the ink onto a side facing the printing paper PA. In addition, the holder 3 is detachably mounted with the cartridge 10. Each cartridge 10 contains cyan, magenta, yellow ink and the like, respectively. The ink contained in the cartridge 10 is supplied to the printing head of the holder 3 and the ink is ejected onto the printing paper PA.

The first motor 5 drives the holder 3 in a main scanning direction. The second motor 7 transports the printing paper PA in a sub-scanning direction. The control unit 9 controls the entire operation of the printer 1. The detection device 15 is provided in the printer 1 and optically detects a remaining amount of the ink in the cartridge 10. In the embodiment, as a method for detecting the remaining amount of the ink, a method for detecting whether or not the remaining amount of the ink in the cartridge 10 is lower than a predetermined amount is employed.

The control unit 9 controls the first motor 5, the second motor 7 and the printing head and then the printing is performed, based on printing data received from a computer 17 or the like connected via the predetermined interface 13. In addition, the control unit 9 determines a remaining amount state (the remaining amount of the ink or presence or absence of the ink) of the ink in the cartridge 10, based on a result received from the detection device 15. The operation section 12 is connected to the control unit 9 and accepts various types of operations from a user.

Configuration of Cartridge

Figure 2B:
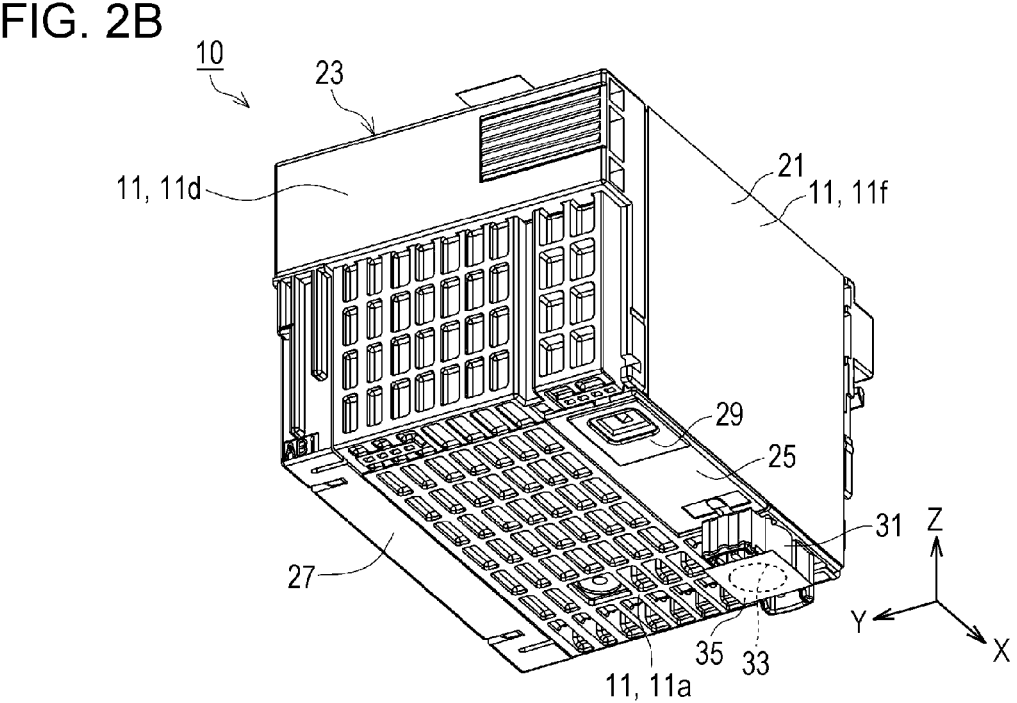

The cartridge 10 has a substantially rectangular parallelepiped shape as illustrated in FIG. 2A that is an first perspective view of an exterior of the cartridge 10 and FIG. 2B that is a second perspective view of an exterior of the cartridge 10. In addition, XYZ axes, which are coordinate axes orthogonal to each other, are denoted in FIGS. 2A and 2B. The XYZ axes are also denoted in the drawings illustrated below as necessary. A Z-axis negative direction is a vertical downward direction in a mounted state (a mounted posture) in which the cartridge 10 is mounted on the printer 1 disposed on a horizontal plane. In addition, the horizontal plane is a plane parallel to an X-axis direction and a Y-axis direction.

An outer surface (an outer case) of the cartridge 10 has six surfaces 11. Hereinafter, when identifying the six surfaces 11, respectively, the six faces 11 are denoted as a bottom surface 11a, an upper surface 11b, a front surface 11c, a rear surface 11d, a right side surface 11e and a left side surface 11f, respectively. The six surfaces 11 can be also considered as an outer case member configuring the outer case of the cartridge 10. Each of the surfaces 11 is in a planar shape. The term "in a planar shape" means a condition where the entire surfaces are completely planar or a condition where a part of the surfaces is uneven. In other words, the surfaces may have some uneven parts. Each exterior surface 11 is a substantially rectangular shape in a plan view. The outer surface (the outer case) of the cartridge 10 includes a film 21 configuring a part of the left side surface 11f, a case 23, a cover 25 and a cover 27 configuring the right side surface 11e.

In addition, the term "the bottom surface 11a" has a definition that can include a wall forming a bottom wall of the cartridge 10 in the mounted state and may be also referred to as "a bottom surface wall section (the bottom wall)". In addition, the term "the upper surface 11b" has a definition that can include a wall forming an upper wall of the cartridge 10 in the mounted state and may be also referred to as "an upper surface wall section (the upper wall)". In addition, the term "the front surface 11c" has a definition that can include a wall forming a front surface wall of the cartridge 10 in the mounted state and may be also referred to as "a front surface wall section (the front surface wall)". In addition, the term "the rear surface 11d" has a definition that can include a wall forming a rear surface wall in the mounted state and may be also referred to as "a rear surface wall section (the rear surface wall)". In addition, the term "the right side surface 11e" has a definition that can include a wall forming a right side wall in the mounted state and may be also referred to as "a right side surface wall section (the right side surface wall)". In addition, the term "the left side surface 11f" has a definition that can include a wall forming a left side wall in the mounted state and may be also referred to as "a left side surface wall section (the left side surface wall)". In addition, "the wall section" or "the wall" is not necessary to be formed in a single wall and may be formed in a plurality of walls. For example, the bottom surface wall section (the bottom surface 11a) is a wall which is positioned in the Z-axis negative direction side with respect to an inner space of the cartridge 10. In other words, as illustrated in FIG. 2B, the bottom surface wall section (the bottom surface 11a) is formed with the cover 25 or the case 23, a detection member 29 described below or the like.

The bottom surface 11a and the upper surface 11b face each other having a clearance in the Z-axis direction. The front surface 11c and the rear surface 11d face each other having a clearance in the X-axis direction. The right side surface 11e and the left side surface 11f face each other having a clearance in the Y-axis direction. A length (a length in the X-axis direction), a width (a length in the Y-axis direction) and a height (a length in the Z-axis direction) of the cartridge 10 become larger in the order of the length, the width and the height. Magnitude relation among the length, the width and the height of the cartridge 10 may be changed arbitrarily. For example, it can be longer in the order of the height, the length and the width or the height, the length and the width may be the same with each other.

As illustrated in FIG. 2B, a supply section 31 is provided on the bottom surface 11a. The supply section 31 protrudes from the bottom surface 11a in the Z-axis negative direction. The supply section 31 has a substantially cylindrical shape. The bottom surface 11a is a horizontal surface in the mounted state. A liquid supply needle, which is inserted into the supply section 31 to supply the ink to the printing head, is provided in the holder 3. A supply port 33 is formed on an end surface of the supply section 31 to supply the ink in the cartridge 10 to the outside. The liquid supply needle is inserted into the supply port 33 and then the cartridge 10 is connected to the holder 3. Before the cartridge 10 is mounted on the printer 1, the supply port 33 is blocked by a film 35. The film 35 is configured so as to be broken by the liquid supply needle.

The bottom surface 11a has the detection member 29. In the embodiment, the detection member 29 is provided in a position which is nearer to the rear surface 11d than the front surface 11c. In other words, the detection member 29 is provided in a position which is nearer to the rear surface 11d than a position in which the supply section 31 is provided in the bottom surface 11a. The detection member 29 is used to detect the remaining amount state of the liquid in the cartridge 10 using the detection device 15. The detection member 29 is transparent and covers an opening section (described below) provided in the bottom surface 11a of the case 23 from outside. The opening section provided in the bottom surface 11a of the case 23 communicates with a containing section (described below) containing the ink. In the embodiment, the containing chamber can be visibly recognized through the detection member 29. In addition, the detection member 29 may be semi-transparent.

As illustrated in FIGS. 2A and 2B, the front surface 11c intersects the bottom surface 11a. In addition, the front surface 11c intersects the upper surface 11b. A circuit substrate 40 is provided in a position which is nearer to the bottom surface 11a than the upper surface 11b in the front surface 11c. A plurality of terminals 41 are formed on a surface of the circuit substrate 40. Each of the plurality of terminals 41, which come into contact with a corresponding terminal of a plurality of terminals in an apparatus side, are provided in the holder 3 in the mounted state. In this way, the circuit substrate 40 is electrically connected to the control unit 9 of the printer 1. In addition, a rewritable memory is provided on a rear surface of the circuit substrate 40. Information regarding the cartridge 10 such as a consumption amount of the ink or the color of the ink of the cartridge 10 is recorded in the memory. In addition, a lever 43 is provided in a position which is nearer to the upper surface 11b than the circuit substrate 40 in the front surface 11c. The lever 43 is elastically deformed and is used for mounting and demounting the cartridge 10 in the printer 1.

As illustrated in FIG. 2A, an air opening port 45 is formed on the upper surface 11b. The air opening port 45 is an opening for introducing the air into the cartridge 10. A film 47 for sealing the air opening port 45 is attached to the cartridge 10 which is ready to be used after the ink is contained. When the cartridge 10 is used, the user mounts the cartridge 10 on the holder 3 after peeling off the film 47.

Herein, directions of the cartridge 10 can be defined as follows using the XYZ axes that are coordinate axes orthogonal to each other. In other words, a direction in which the bottom surface 11a and the upper surface 11b are opposite to each other is the Z-axis direction. In addition, a direction from the bottom surface 11a to the upper surface 11b in the Z-axis direction is a Z-axis positive direction. In addition, a direction from the upper surface 11b to the bottom surface 11a in the Z-axis direction is a Z-axis negative direction. In addition, a direction in which the front surface 11c and the rear surface 11d are opposite to each other is the X-axis direction. In addition, a direction from the rear surface 11d to the front surface 11c in the X-axis direction is an X-axis positive direction. In addition, a direction from the front surface 11c to the rear surface 11d in the X-axis direction is an X-axis negative direction. In addition, a direction in which the right side surface 11e and the left side surface 11f are opposite to each other is the Y-axis direction. In addition, a direction from the left side surface 11f to the right side surface 11e in the Y-axis direction is a Y-axis positive direction. In addition, a direction from the right side surface 11e to the left side surface 11f in the Y-axis direction is a Y-axis negative direction.

In addition, directions of the cartridge 10 can be defined as follows using the XYZ axes that are coordinate axes orthogonal to each other. A direction in which the supply section 31 extends from the bottom surface 11a is the Z-axis direction. A direction from the upstream part to the downstream part in a flow direction of the fluid is the Z-axis negative direction in the Z-axis direction. In addition, a direction from the downstream part to the upstream part in the flow direction of the fluid is the Z-axis positive direction in the Z-axis direction. In addition, when the cartridge 10 is mounted and demounted in the holder 3, a moving direction of the cartridge 10 may be referred to as the Z-axis direction. When the cartridge 10 is mounted on the holder 3, the moving direction thereof is the Z-axis negative direction in the Z-axis direction. When the cartridge 10 is demounted from the holder 3, the moving direction thereof is the Z-axis positive direction in the Z-axis direction. In addition, a direction, in which the cartridge 10 mounted on the holder 3 is moved in the main scanning direction by the driving of the first motor 5 (FIG. 1), is the Y-axis direction. In addition, the length direction of the cartridge 10 is the X-axis direction, the width direction thereof is the Y-axis direction and the height direction thereof is the Z-axis direction.

Figure 3:
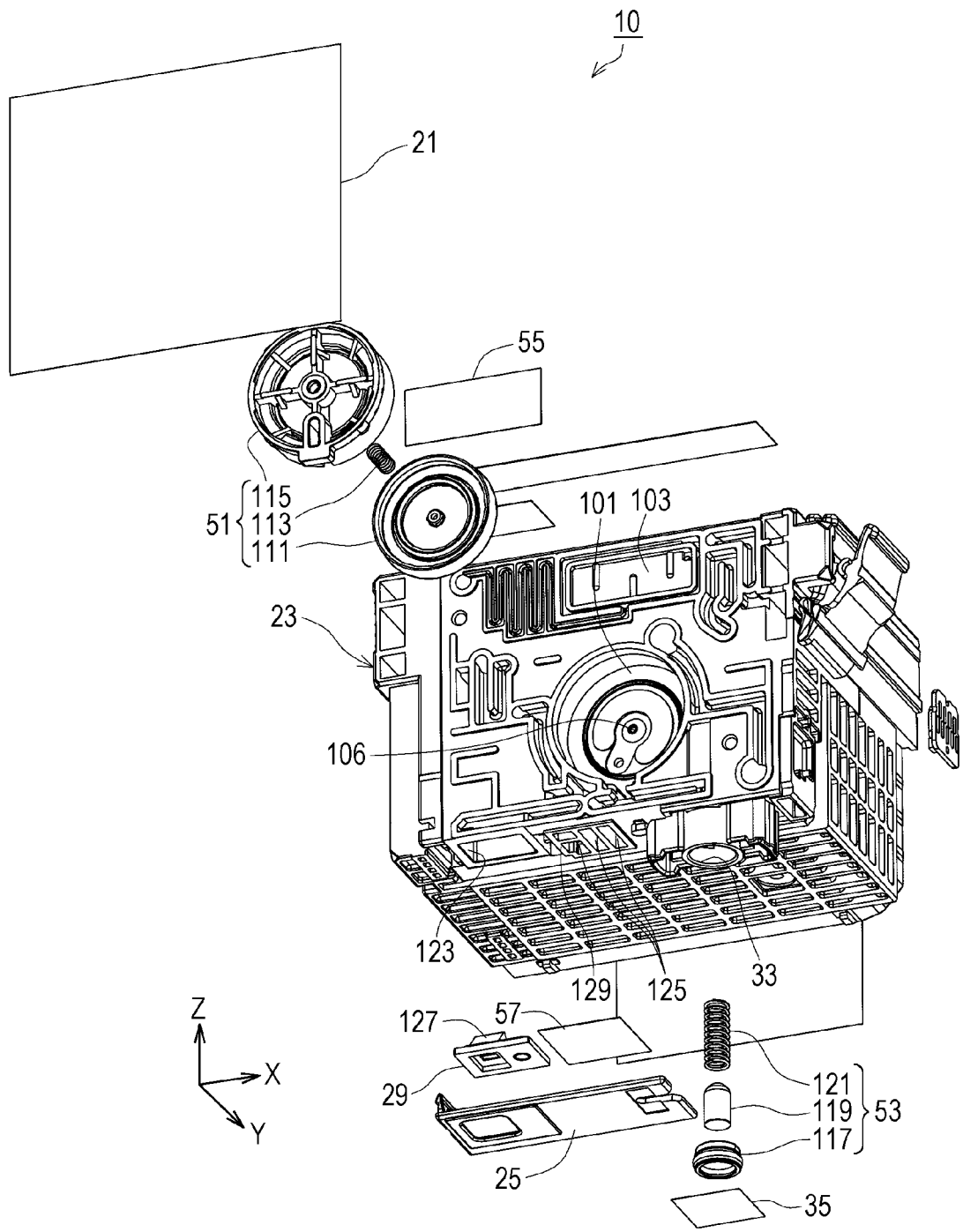
FIG. 3 is an exploded perspective view of the cartridge in the embodiment.

As illustrated in FIG. 3, the cartridge 10 has a valve unit 51, a supply section unit 53, a filter 55 and a film 57 in addition to the configuration described above. In addition, as illustrated in FIG. 4, the cartridge 10 has a label 59, a film 61, a reinforcing member 63 and a film 65.

Figure 5A:
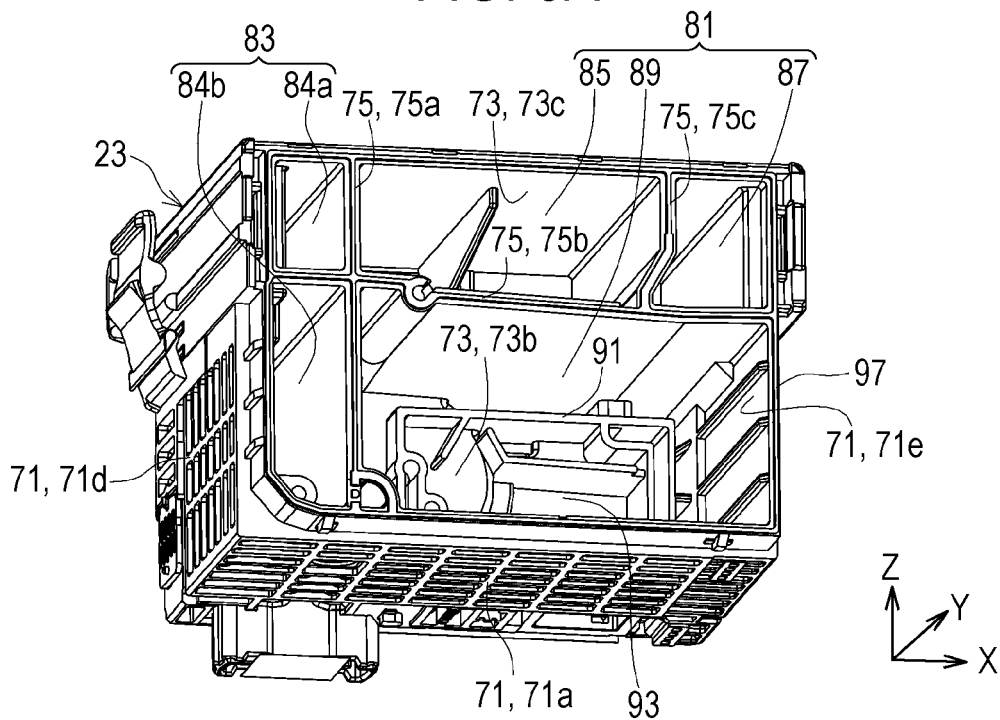
FIGS. 5A and 5B are perspective views illustrating exteriors of a case in the embodiment.

Herein, the case 23 will be described. The case 23 has five walls 71 as illustrated in FIG. 5A that is a first perspective view of an exterior of the case 23 and FIG. 5B that is a second perspective view of an exterior of the case 23. The case 23 has a concave shape surrounded by the five walls 71. Hereinafter, when identifying the five walls 71, respectively, the five walls 71 are denoted as a first wall 71a, a second wall 71b, a third wall 71c, a fourth wall 71d and a fifth wall 71e, respectively. The first wall 71a configures a portion of the bottom surface 11a of the cartridge 10. The film 21 is bonded to the second wall 71b. The third wall 71c configures a portion of the upper surface 11b of the cartridge 10. The fourth wall 71d configures a portion of the front surface 11c of the cartridge 10. The fifth wall 71e configures a portion of the rear surface 11d of the cartridge 10.

The first wall 71a and the third wall 71c are opposite to each other having a clearance in the Z-axis direction. The fourth wall 71d and the fifth wall 71e are opposite to each other having a clearance in the X-axis direction. The second wall 71b intersects the first wall 71a, the third wall 71c, the fourth wall 71d and the fifth wall 71e. The first wall 71a intersects the fourth wall 71d and the fifth wall 71e. The third wall 71c also intersects the fourth wall 71d and the fifth wall 71e. In this way, the case 23 has the concave shape in which the second wall 71b is a bottom. Then, a rear surface of each of the walls 71 configures inner walls 73 of the case 23 having the concave shape. The case 23 has five inner walls 73 corresponding to the five walls 71, respectively. Hereinafter, when identifying the five inner walls 73, respectively, the five inner walls 73 are denoted as a first inner wall 73a, a second inner wall 73b, a third inner wall 73c, a fourth inner wall 73d and a fifth inner wall 73e. The first inner wall 73a corresponds to the first wall 71a. Similarly, the second inner wall 73b corresponds to the second wall 71b, the third inner wall 73c corresponds to the third wall 71c, the fourth inner wall 73d corresponds to the fourth wall 71d and the fifth inner wall 73e corresponds to the fifth wall 71e.

A plurality of partition plates 75 are provided in the case 23. The inside of the case 23 is divided into a plurality of chambers by the plurality of partition plates 75. In the embodiment, three partition plates 75 are provided in the case 23 and the inside of the case 23 is divided into five chambers by the three partition plates 75. Hereinafter, when identifying the three partition plates 75, respectively, the three partition plates 75 are denoted as a first partition plate 75a, a second partition plate 75b and a third partition plate 75c, respectively. The first partition plate 75a is provided from the third inner wall 73c throughout the first inner wall 73a (a rear surface of the first wall 71a) in the Z-axis direction. The second partition plate 75b is provided from the fourth inner wall 73d (a rear surface of the fourth wall 71d) throughout the fifth inner wall 73e in the X-axis direction. The first partition plate 75a and the second partition plate 75b cross each other. The third partition plate 75c is positioned between the first partition plate 75a and the fifth inner wall 73e, and is provided from the third inner wall 73c throughout the second partition plate 75b in the Z-axis direction.

Three chambers in the five chambers divided by the three partition plates 75, which are interposed between the first partition plate 75a and the fifth inner wall 73e, have functions as a containing section 81 containing the ink. On the other hand, two chambers interposed between the first partition plate 75a, the fourth inner wall 73d (a rear surface of the fourth wall 71d) have functions as an air introducing section 83 introducing air. The air introducing section 83 includes a first air chamber 84a and a second air chamber 84b. The containing section 81 includes a first containing chamber 85, a second containing chamber 87 and a third containing chamber 89. A bank 91 is provided in the third containing chamber 89. The bank 91 is provided in annular shape in the second inner wall 73b and protrudes from the second inner wall 73b. Inside of a region surrounded by the bank 91 is partitioned from the third containing chamber 89 as a fourth containing chamber 93. In other words, the third containing chamber 89 includes the fourth containing chamber 93.

End portions of three partition plates 75 which are opposite to the second inner wall 73b side and end portions of four walls 71 except the second wall 71b, which are opposite to the second inner wall 73b side, have the same height with each other in the Y-axis direction. Then, the film 65 illustrated in FIG. 4 is bonded throughout end portions of three partition plates 75 which are opposite to the second inner wall 73b side and end portions of four walls 71 except the second wall 71b, which are opposite to the second inner wall 73b side. In this way, five chambers partitioned by three partition plates 75 are sealed individually. In addition, as illustrated in FIG. 5A, a bank 97 is provided in the case 23 throughout end portions of three partition plates 75 which are opposite to the second inner wall 73b side and end portions of four walls 71 except the second wall 71b, which are opposite to the second inner wall 73b side. In the embodiment, the film 65 illustrated in FIG. 4 is welded to the bank 97.

Figure 6A:
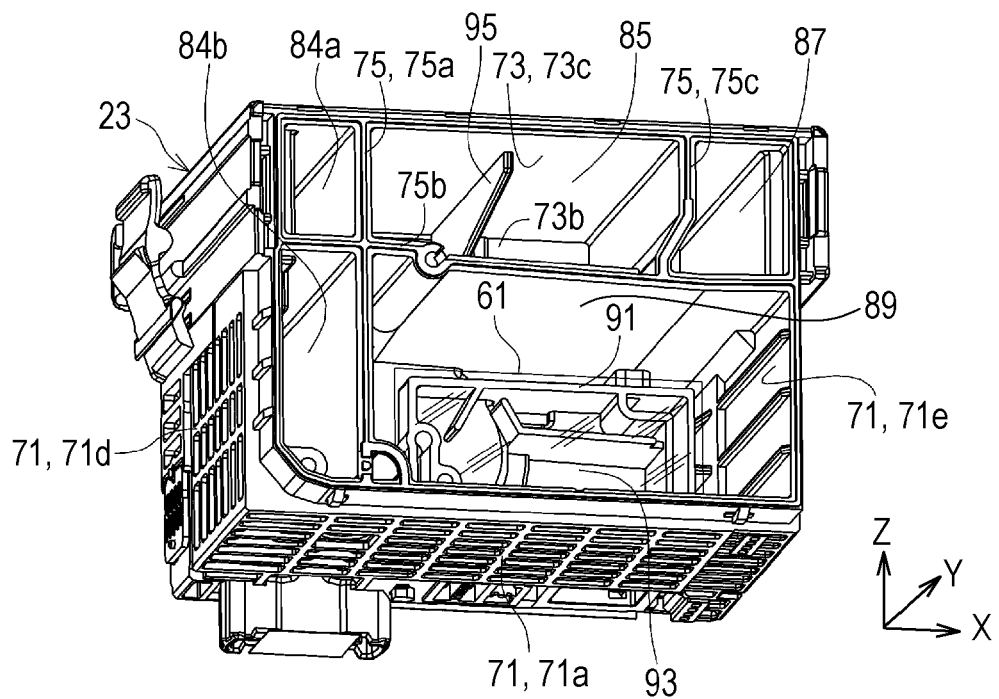
FIGS. 6A and 6B are perspective views illustrating the exteriors of the case in the embodiment.

An end portion of the bank 91 which is opposite to the second inner wall 73b side is positioned nearer to the second inner wall 73b side than end portions of three partition plates 75 which are opposite to the second inner wall 73b side. In other words, a height of the bank 91 in the Y-axis direction is lower than a height of the three partition plates 75 in the Y-axis direction. Thus, the fourth containing chamber 93 surrounded by the bank 91 is housed in the third containing chamber 89. Then, As illustrated in FIG. 6A which is a perspective view illustrating a state where the film 61 is bonded to the case 23, the film 61 is bonded to the end portion of the bank 91 which is opposite to the second inner wall 73b side. In this way, the fourth containing chamber 93 is partitioned from the third containing chamber 89. In addition, a rib 95 is provided in the first containing chamber 85. The rib 95 is positioned between the first partition plate 75a and the third partition plate 75c and intersects the second inner wall 73b and the third inner wall 73c. For example, the case 23 having the configuration described above may be manufactured by molding synthetic resin such as polyethylene, polystyrene and polypropylene.

Figure 5B:
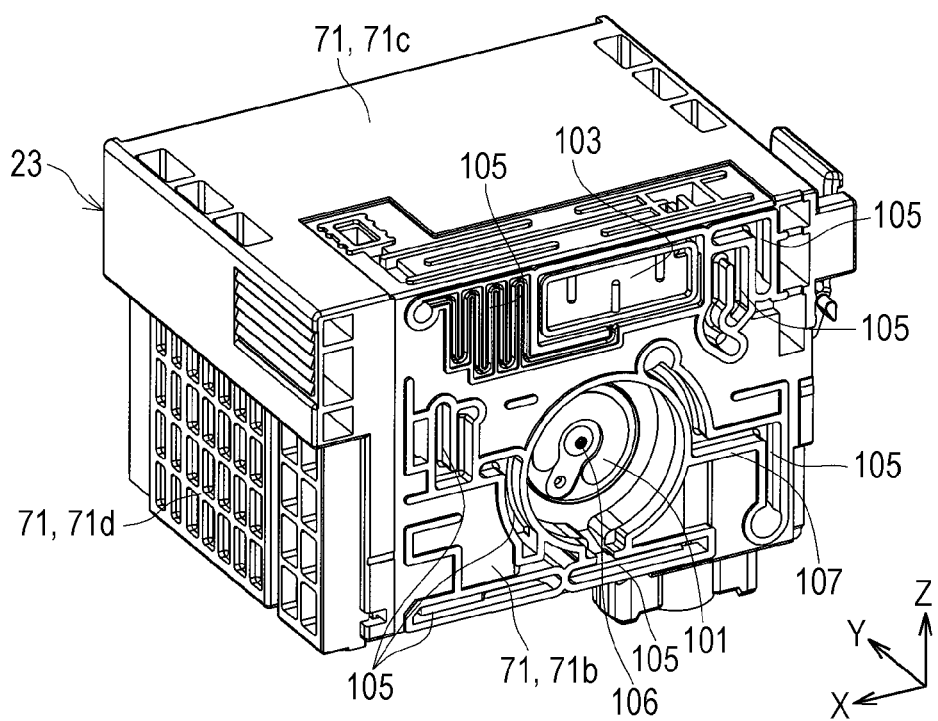

As illustrated in FIG. 5B, the second wall 71b has a valve chamber 101, a separation chamber 103 and a plurality of grooves 105. A valve hole 106 is formed in a bottom portion of the valve chamber 101. The valve chamber 101, the separation chamber 103 and the plurality of the grooves 105 have concave shapes which are concave from the second wall 71b to the second inner wall 73b side, respectively. The valve chamber 101, the separation chamber 103 and the plurality of the grooves 105 configure a portion of a flow path of the air or the ink. A bank 107, which is convex from the second wall 71b to a side opposite to the second inner wall 73b side, is provided in a periphery of the valve chamber 101, the separation chamber 103 and the plurality of the grooves 105, respectively. The film 21 illustrated in FIG. 3 is bonded to the bank 107. In this way, the valve chamber 101, the separation chamber 103 and the plurality of the grooves 105 are sealed individually and respectively.

As illustrated in FIG. 3, the valve unit 51 is contained in the valve chamber 101. The separation chamber 103 is covered from the outside by the filter 55. In a state where the valve unit 51 is contained in the valve chamber 101 and the separation chamber 103 is covered by the filter 55, the film 21 is bonded to the case 23. Thus, the valve unit 51 is surrounded by the film 21 and the case 23. In addition, the filter 55 is also surrounded by the film 21 and the case 23. The filter 55 is configured of a material which permits transmission of the gas or does not permit transmission of the liquid. The valve chamber 101, the separation chamber 103 and the plurality of the grooves 105 have functions as the flow path of the air or the ink by bonding the film 21 to the case 23.

The valve unit 51 includes a valve body 111, a spring 113 and a spring seat 115. Since the valve body 111 is deformed, based on a pressure difference of the flow path interposing the valve body 111 in the flow direction of the fluid from the air opening port 45 to the supply port 33, the valve unit 51 opens and closes the flow path. The spring 113 biases the valve body 111 in a direction that presses the valve body 111 to the valve hole 106. A pressure on the downstream part (also referred to as "downstream part from the valve") from the valve chamber 101 is adjusted to be lower than a pressure on the upstream part (also referred to as "upstream part from the valve") from the valve chamber 101 by the valve body 111 and the downstream part from the valve is a negative pressure with respect to the atmosphere pressure. When the cartridge 10 is mounted on the printer 1 and the ink on the downstream part from the valve is consumed, an absolute value of the negative pressure on the downstream part from the valve is increased and the valve body 111 is deformed so as to be separated from the valve hole 106. Then, the ink in the valve chamber 101 is supplied to the downstream part from the valve chamber 101 and the downstream part from the valve returns to a negative pressure in a predetermined range. In this way, the valve body 111 is deformed so that the valve hole 106 is blocked by a force of the spring 113. In addition, as the ink in the containing section 81 is consumed, the atmosphere (the air) is introduced to the containing section 81 via the air opening port 45.

The supply section unit 53 is provided in the supply section 31. The supply section unit 53 includes a seal member 117, a spring seat 119 and a spring 121. The seal member 117 seals between an inner wall of the supply section 31 and an outer wall of the liquid supply needle so as not to have a clearance therebetween when the liquid supply needle of the printer 1 is inserted into the supply section 31. The spring seat 119 abuts the seal member 117 to close the flow path in the supply section 31 when the cartridge 10 is not mounted on the holder 3. The spring 121 is biased in a direction in which the spring seat 119 abuts the seal member 117. When the liquid supply needle is inserted into the supply section 31, the liquid supply needle pushes up the spring seat 119 in the Z-axis positive direction, a clearance occurs between the spring seat 119 and the seal member 117, and the ink is supplied from the clearance to the liquid supply needle.

As illustrated in FIG. 3, an opening section 123 and a plurality of grooves 125 are provided in the first wall 71a (the bottom surface 11a) of the case 23. A prism section 127 provided in the detection member 29 is inserted into the opening section 123. The opening section 123 is sealed by the detection member 29 in a state where the prism section 127 is inserted. The plurality of the grooves 125 have a concave shape which is concave from the first wall 71a to the third inner wall 73c (FIGS. 5A and 5B) side, respectively, in other words, toward the inside of the case 23. The plurality of the grooves 125 configure a portion of the flow path of the air or the ink, respectively. A bank 129, which is convex from the first wall 71a to a side opposite to the inside of the case 23, is provided around each of the plurality of the grooves 125. The film 57 is bonded to the bank 129. In this way, each of the plurality of the grooves 125 is individually sealed, respectively. The cover 25 is attached to the case 23 so as to cover the film 57. The cover 25 also configures a portion of the bottom surface 11a by covering a portion of the first wall 71a of the case 23.

The prism section 127 protrudes into the fourth containing chamber 93 and functions as the detection member to optically detect whether or not the ink is present by the detection device 15 provided in the printer 1. For example, the prism section 127 is a member having light transmission property and forming of a synthetic resin such as polypropylene. A member configuring the detection member 29 including the prism section 127 may not be transparent if the member has an appropriate light transmission property. In addition, if the optical detection is not performed, the detection member 29 may not have the light transmission property. In addition, if the optical detection is not performed, a member which does not transmit light may be attached or coating may be applied to the surface of the prism section 127. For example, the presence or absence of the ink in the fourth containing chamber 93 is detected as follows. An optical sensor having a light emitting element and a light receiving element is provided in the detection device 15 provided in the printer 1. The light is emitted from the light emitting element to the prism section 127 of the detection member 29. When the ink is present around the prism section 127, the light passes through the prism section 127 and is directed into the fourth containing chamber 93. Meanwhile, when the ink is not present around the prism section 127, the light emitted from the light emitting element is reflected by two reflecting surfaces of the prism section 127 and reaches the light receiving element. The printer 1 determines whether or not the ink is present in the fourth containing chamber 93, based on whether the light reaches the light receiving element.

As described above, the fourth containing chamber 93 is provided in the third containing chamber 89. The volume of the fourth containing chamber 93 is smaller than the volume of the third containing chamber 89. The third containing chamber 89 has a wider bottom area in a direction crossing the vertical direction compared to the fourth containing chamber 93. Then, the prism section 127 protrudes into the fourth containing chamber 93 having a smaller volume than the third containing chamber 89. In other words, in the embodiment, a configuration is employed in which the remaining amount of the ink is detected by detecting the ink amount in the fourth containing chamber 93 via the prism section 127 provided in the fourth containing chamber 93.

Herein, for example, the presence or absence of the ink may be detected (detecting the remaining amount of the ink) even in a configuration in which the fourth containing chamber 93 is omitted and the prism section 127 is provided in the third containing chamber 89. In this configuration, the remaining amount of the ink is detected by detecting the ink amount in the third containing chamber 89. However, in this configuration, detection accuracy in detecting the remaining amount of the ink tends to deteriorate easily compared to the embodiment. This is because variation in an absolute amount of the ink is increased when the area of the containing section is increased in the direction crossing the vertical direction in a case where the level of the liquid surface of the ink for detecting the remaining amount of the ink has the same variation.

Accordingly, in the embodiment, the configuration is employed in which the fourth containing chamber 93 having the volume smaller than that of the third containing chamber 89 is divided in the third containing chamber 89 and the prism section 127 is provided in the fourth containing chamber 93. In this way, even when the level of the liquid surface of the ink detecting the remaining amount of the ink is varied, the variation in the absolute amount of the ink can be decreased. As a result, it is possible to avoid deterioration of the detection accuracy in detecting the remaining amount of the ink.

Figure 6B:
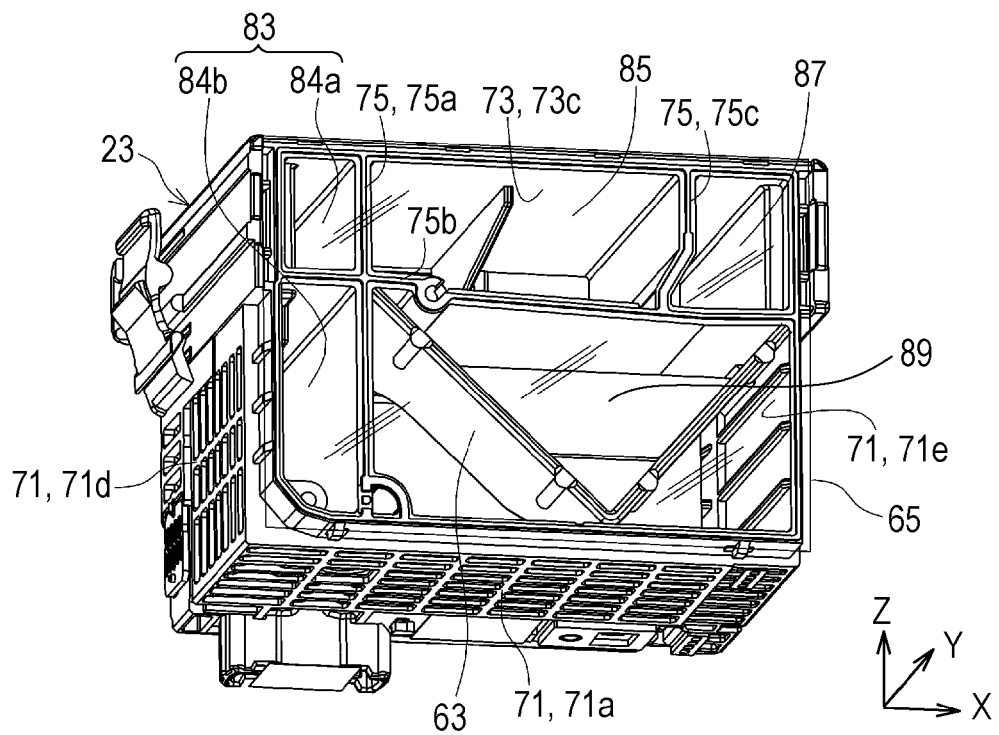

As described above, the film 61 illustrated in FIG. 4 is bonded to the bank 91 in the third containing chamber 89. In the embodiment, the film 61 is welded to the bank 91. The reinforcing member 63 is provided in the third containing chamber 89 after the film 61 is bonded to the bank 91. As illustrated in FIG. 6B that is a perspective view illustrating a state where the reinforcing member 63 is incorporated to the case 23, the reinforcing member 63 is fitted into the third containing chamber 89. The case 23 is reinforced by the reinforcing member 63 and deflection or deformation of the case 23 can be reduced. Then, the film 65 is bonded to the case 23 after the reinforcing member 63 is fitted into the third containing chamber 89. In the embodiment, the film 65 is welded over the ends portion of three partition plates 75 and the ends portion of four walls 71 except the second wall 71b.

As illustrated in FIG. 4, the cover 27 is provided in a side opposite to the case 23 side with respect to the film 65. A surface of the cover 27 opposite to the case 23 configures the right side surface 11e. In addition, the cover 27 configures a portion of the bottom surface 11a by covering a portion of the first wall 71a of the case 23. In addition, the cover 27 configures a portion of the front surface 11c by covering a portion of the fourth wall 71d of the case 23. In addition, the cover 27 configures a portion of the rear surface 11d by covering a portion of the fifth wall 71e of the case 23.

As illustrated in FIG. 4, a groove 131 is provided on the third wall 71c (the upper surface 11b) of the case 23. The groove 131 has a concave shape which is concave from the third wall 71c to the first inner wall 73a side, in other words, toward the inside of the case 23. The groove 131 configures a portion of the flow path of the air or the ink. A bank 133, which is convex from the third wall 71c to a side opposite to the inside of the case 23, is provided around the groove 131. The label 59 is bonded to the bank 133. In this way, the groove 131 is sealed.

Figure 7:
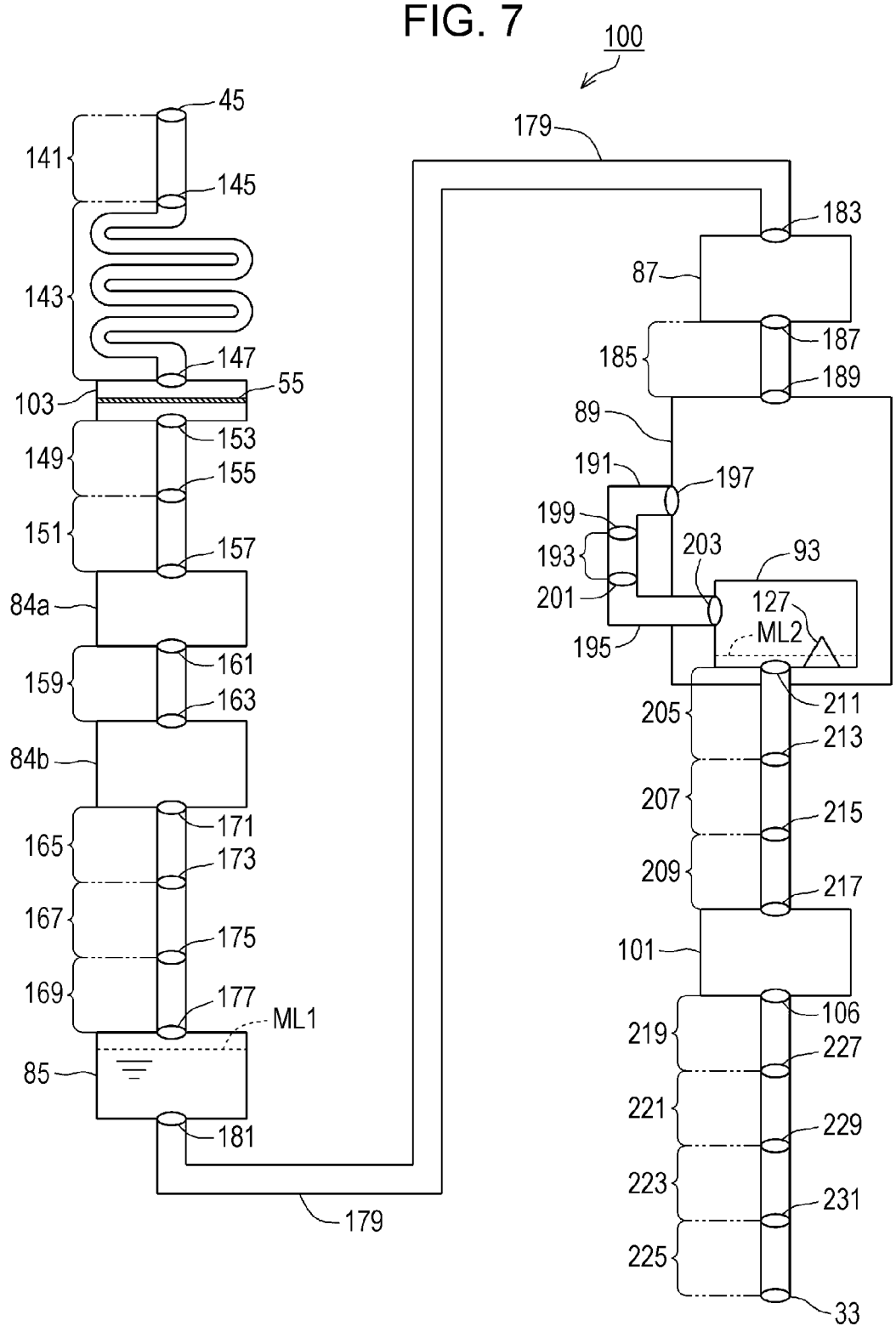
FIG. 7 is a view schematically illustrating a flow path from an air opening port to a supply port in the embodiment.

The flow path from the air opening port 45 to the supply port 33 will be described. Herein, to facilitate the understanding, first, the flow path from the air opening port 45 to the supply port 33 is conceptually described. In addition, a direction from the air opening port 45 to the supply port 33 is a direction in which the liquid flows. Then, the direction is standard of "upstream" and "downstream". As illustrated in FIG. 7, a flow path 100 from the air opening port 45 to the supply port 33 includes the separation chamber 103, the first air chamber 84a, the second air chamber 84b, the first containing chamber 85, the second containing chamber 87, the third containing chamber 89, the fourth containing chamber 93, and the valve chamber 101. The separation chamber 103 is provided on the downstream part of the flow path 100 from the air opening port 45. The first air chamber 84a is provided on the downstream part from the separation chamber 103. The second air chamber 84b is provided on the downstream part from the first air chamber 84a. The first containing chamber 85 is provided on the downstream part from the second air chamber 84b. The second containing chamber 87 is provided on the downstream part from the first containing chamber 85. The third containing chamber 89 is provided on the downstream part from the second containing chamber 87. The fourth containing chamber 93 is provided on the downstream part from the third containing chamber 89. The valve chamber 101 is provided on the downstream part from the fourth containing chamber 93.

The air opening port 45 and the separation chamber 103 communicate with each other via a first inner flow path 141 and a serpentine flow path 143. The first inner flow path 141 is provided on the downstream part from the air opening port 45. The air opening port 45 communicates with the first inner flow path 141. The serpentine flow path 143 is provided on the downstream part from the first inner flow path 141. The first inner flow path 141 and the serpentine flow path 143 communicate with each other via a communication port 145. The serpentine flow path 143 and the separation chamber 103 communicate with each other via a communication port 147. The serpentine flow path 143 is formed in an elongated serpentine state in order to elongate the length of the flow path from the air opening port 45 to the first containing chamber 85. In this way, it is possible to suppress evaporation of a liquid component of the ink in the containing section 81. In the middle of the separation chamber 103, a filter 55 is disposed so as to divide the flow path. It is possible to suppress entering of the ink into the upstream part of the flow path 100 from the filter 55 by the filter 55 even when the ink is flowed back to the upstream part from the first containing chamber 85.

The separation chamber 103 and the first air chamber 84a communicate with each other via an upper surface flow path 149 and a first surface flow path 151. The upper surface flow path 149 is provided on the downstream part from the separation chamber 103. The separation chamber 103 communicates with the upper surface flow path 149 via a communication port 153. The first surface flow path 151 is provided on the downstream part from the upper surface flow path 149. The upper surface flow path 149 and the first surface flow path 151 communicate with each other via a communication port 155. The first surface flow path 151 and the first air chamber 84a communicate with each other via a communication port 157.

The first air chamber 84a and the second air chamber 84b communicate with each other via a second surface flow path 159. The second surface flow path 159 is provided on the downstream part from the first air chamber 84a. The first air chamber 84a communicates with the second surface flow path 159 via a communication port 161. The second surface flow path 159 and the second air chamber 84b communicate with each other via a communication port 163.

The first air chamber 84a and the second air chamber 84b captures (traps) the ink which is flowed back when the air in the containing section 81 is inflated due to a increase in the temperature or the like and the ink in the containing section 81 is flowed back to the upstream part from the first containing chamber 85. In this way, the ink, which is flowed back to the upstream part from the first containing chamber 85, can be prevented from leaking from the air opening port 45. In the embodiment, the volume of the second air chamber 84b close to the first containing chamber 85 in the plurality of the air chambers are larger than the volume of the first air chamber 84a. In this way, even when the ink is flowed back, the ink can be trapped at further downstream part thereof (a part away from the air opening port 45).

The second air chamber 84b and the first containing chamber 85 communicate with each other via a second inner flow path 165, a third surface flow path 167 and a third inner flow path 169. The second inner flow path 165 is provided on the downstream part from the second air chamber 84b. The second air chamber 84b communicates with the second inner flow path 165 via a communication port 171. The third surface flow path 167 is provided on the downstream part from the second inner flow path 165. The second inner flow path 165 and the third surface flow path 167 communicate with each other via a communication port 173. The third inner flow path 169 is provided on the downstream part from the third surface flow path 167. The third surface flow path 167 and the third inner flow path 169 communicate with each other via a communication port 175. The third inner flow path 169 and the first containing chamber 85 communicate with each other via a communication port 177.

In the embodiment, the atmosphere (air) brought into the flow path 100 via the air opening port 45 can be supplied on the downstream part from the first containing chamber 85 including the first containing chamber 85 by the flow path from the air opening port 45 to the third inner flow path 169.

The first containing chamber 85 and the second containing chamber 87 communicate with each other via a fourth surface flow path 179. The fourth surface flow path 179 is provided on the downstream part from the first containing chamber 85. The first containing chamber 85 communicates with the fourth surface flow path 179 via a communication port 181. The fourth surface flow path 179 and the second containing chamber 87 communicate with each other via a communication port 183.

The second containing chamber 87 and the third containing chamber 89 communicate with each other via a fifth surface flow path 185. The fifth surface flow path 185 is provided on the downstream part from the second containing chamber 87. The second containing chamber 87 communicates with the fifth surface flow path 185 via a communication port 187. The fifth surface flow path 185 and the third containing chamber 89 communicate with each other via a communication port 189.

The third containing chamber 89 and the fourth containing chamber 93 communicate with each other via a first lower surface flow path 191, a fourth inner flow path 193 and a sixth surface flow path 195. The first lower surface flow path 191 is provided on the downstream part from the third containing chamber 89. The third containing chamber 89 communicates with the first lower surface flow path 191 via a communication port 197. The fourth inner flow path 193 is provided on the downstream part from the first lower surface flow path 191. The first lower surface flow path 191 and the fourth inner flow path 193 communicate with each other via a communication port 199. The sixth surface flow path 195 is provided on the downstream part from the fourth inner flow path 193. The fourth inner flow path 193 and the sixth surface flow path 195 communicate with each other via a communication port 201. The sixth surface flow path 195 and the fourth containing chamber 93 communicate with each other via a communication port 203.

The fourth containing chamber 93 and the valve chamber 101 communicate with each other via a seventh surface flow path 205, a second lower surface flow path 207 and a first case inner flow path 209. The seventh surface flow path 205 is provided on the downstream part from the fourth containing chamber 93. The fourth containing chamber 93 communicates with the seventh surface flow path 205 via a communication port 211. The second lower surface flow path 207 is provided on the downstream part from the seventh surface flow path 205. The seventh surface flow path 205 and the second lower surface flow path 207 communicate with each other via a communication port 213. The first case inner flow path 209 is provided on the downstream part from the second lower surface flow path 207. The second lower surface flow path 207 and the first case inner flow path 209 communicate with each other via a communication port 215. The first case inner flow path 209 and the valve chamber 101 communicate with each other via a communication port 217.

The valve chamber 101 and the supply port 33 communicate with each other via a second case inner flow path 219, a third lower surface flow path 221, a eighth surface flow path 223 and a supply path 225. The second case inner flow path 219 is provided on the downstream part from the valve chamber 101. The valve chamber 101 communicates with the second case inner flow path 219 via the valve hole 106. The third lower surface flow path 221 is provided on the downstream part from the second case inner flow path 219. The second case inner flow path 219 and the third lower surface flow path 221 communicate with each other via a communication port 227. The eighth surface flow path 223 is provided on the downstream part from the third lower surface flow path 221. The third lower surface flow path 221 and the eighth surface flow path 223 communicate with each other via a communication port 229. The supply path 225 is provided on the downstream part from the eighth surface flow path 223. The eighth surface flow path 223 and the supply path 225 communicate with each other via a communication port 231. Then, the supply port 33 is provided on the downstream part from the supply path 225.

Figure 8:
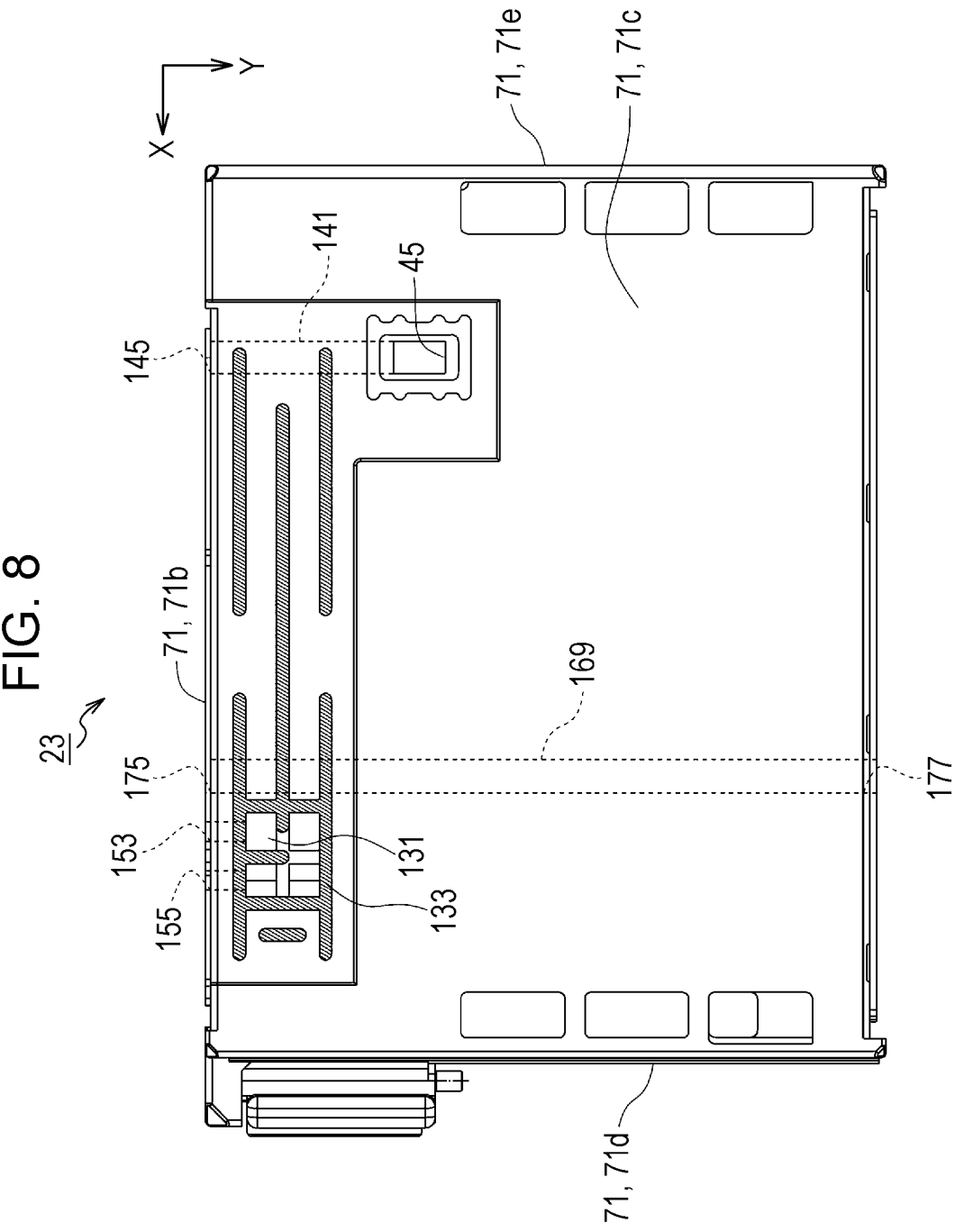
FIG. 8 is a plan view illustrating the case in the embodiment.
Figure 9:
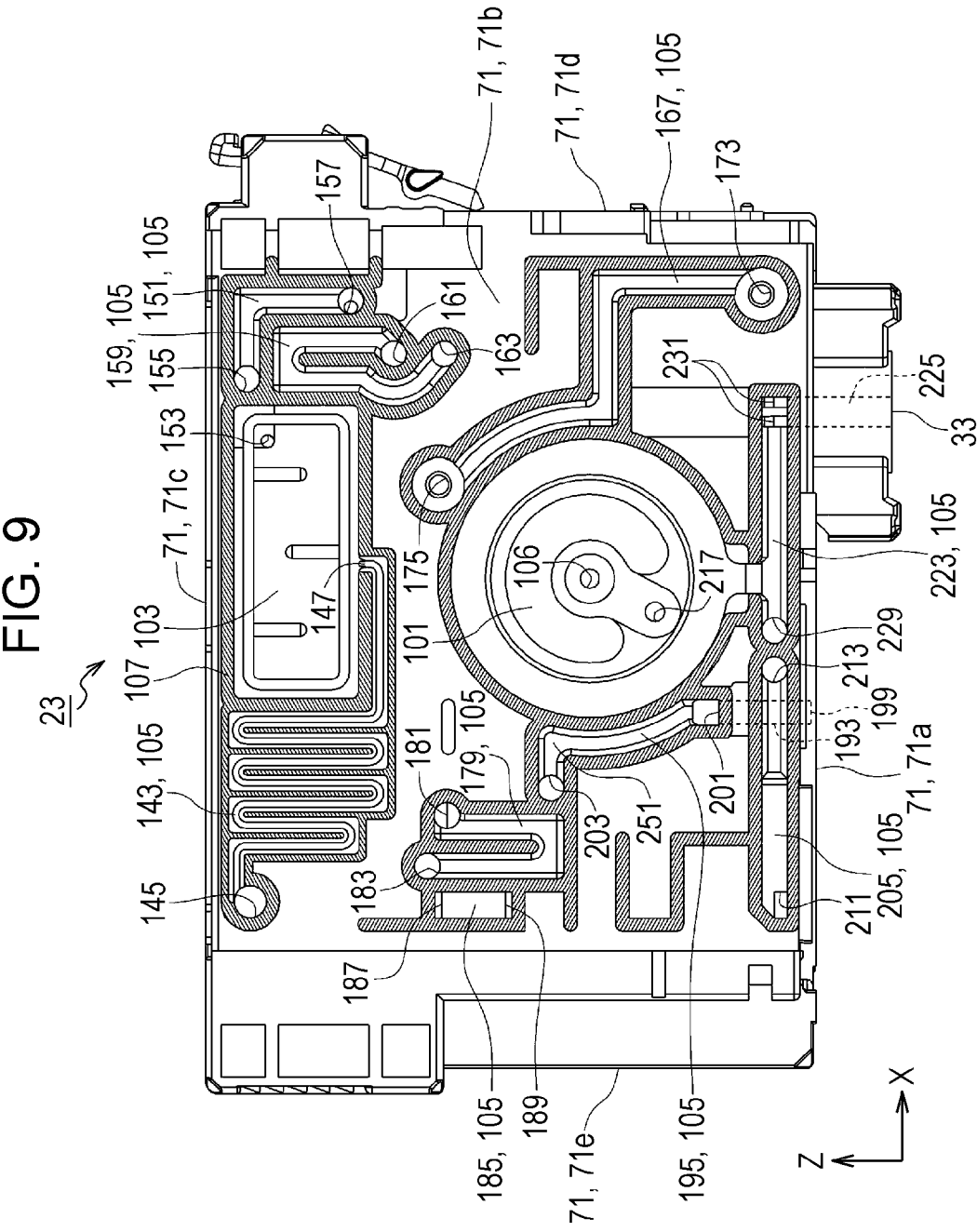
FIG. 9 is a side view illustrating the case in the embodiment.

Next, the above described flow path 100 will be explained with reference to the configuration of the case 23. As illustrated in FIG. 8, the air opening port 45 is open toward the third wall 71*c* of the case 23. The first inner flow path 141 from the air opening port 45 to the communication port 145 extends along the Y-axis direction in the case 23. The first inner flow path 141 leads from the third wall 71*c* to the second wall 71*b* starting from the air opening port 45. As illustrated in FIG. 9, the communication port 145 is open toward the second wall 71*b*. The first inner flow path 141 leads from the third wall 71*c* to the communication port 145.

The serpentine flow path 143 is provided on the second wall 71*b* and configured by the groove 105 connected to the communication port 145. The serpentine flow path 143 communicates with the separation chamber 103 via the communication port 147. In addition, in FIG. 9, in order to facilitate understanding of the configuration, hatching is carried out in the bank 107 surrounding the grooves 105 or the separation chamber 103 and the valve chamber 101. The separation chamber 103 is provided in the second wall 71*b*. The communication port 153 is open inside the separation chamber 103. As illustrated in FIG. 8, the communication port 153 which is open toward the second wall 71*b* communicates with the upper surface flow path 149. The upper surface flow path 149 is provided in the third wall 71*c* and is configured by the groove 131 connected to the communication port 153. In addition, in FIG. 8, in order to facilitate understanding of the configuration, hatching is carried out in the bank 133 surrounding the groove 131. The upper surface flow path 149 leads from the third wall 71*c* to the communication port 155 of the second wall 71*b* starting from the communication port 153.

Figure 10:
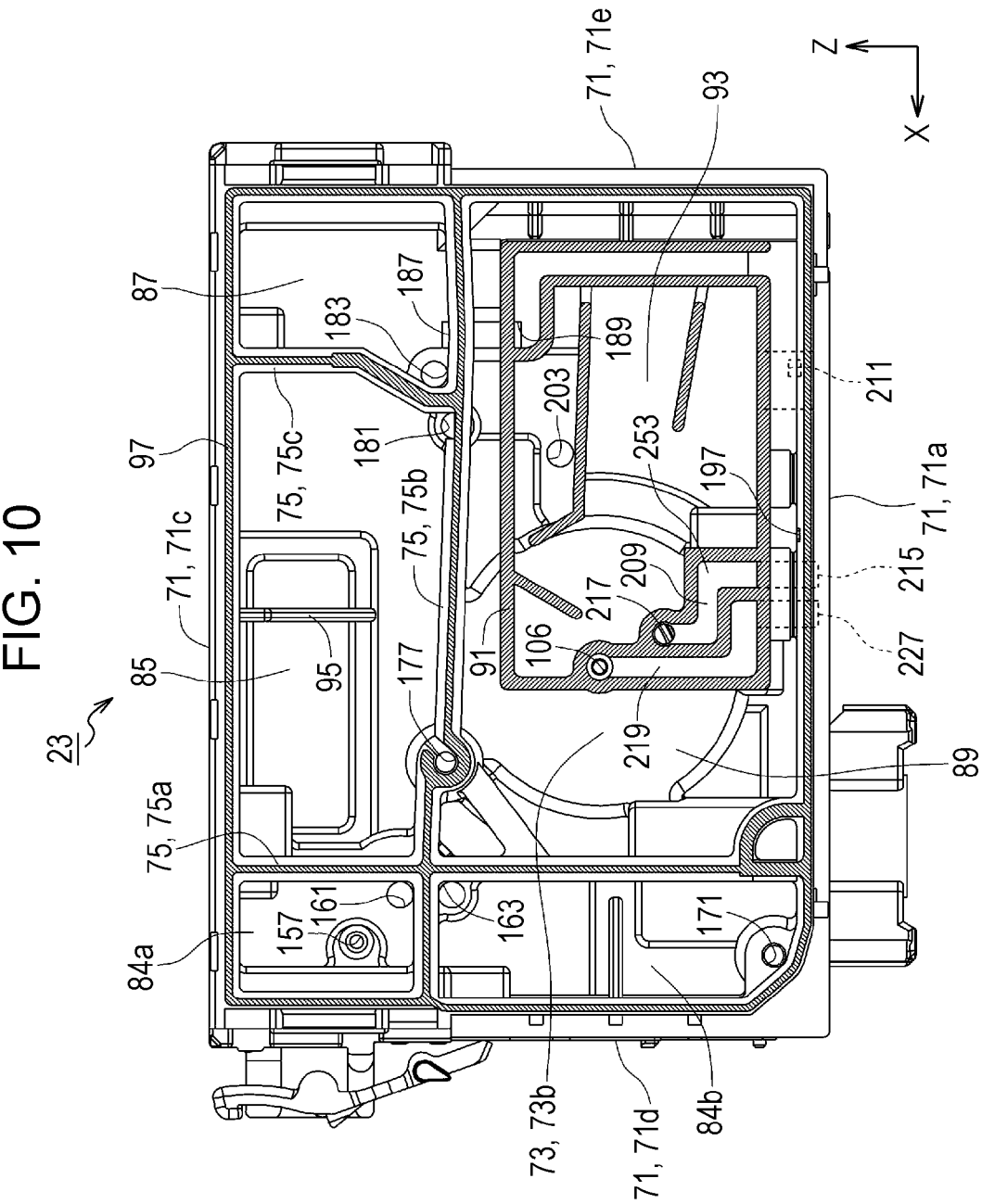
FIG. 10 is a side view illustrating the case in the embodiment.

As illustrated in FIG. 9, the communication port 155 is open toward the second wall 71*b*. The groove 105 connected to the communication port 155 communicates with the communication port 157 as the first surface flow path 151. The communication port 157 is open toward the second wall 71*b*. As illustrated in FIG. 10, the communication port 157 communicates with the first air chamber 84*a*. In addition, in FIG. 10, in order to facilitate understanding of the configuration, hatching is carried out in the bank 97. The communication port 161 is open inside the first air chamber 84*a*. As illustrated in FIG. 9, the communication port 161 open inside the first air chamber 84*a* is also open toward the second wall 71*b*. The groove 105 connected to the communication port 161 communicates with the communication port 163 as the second surface flow path 159. The communication port 163 is open toward the second wall 71*b*. As illustrated in FIG. 10, the communication port 163 communicates with the second air chamber 84*b*.

Figure 11:
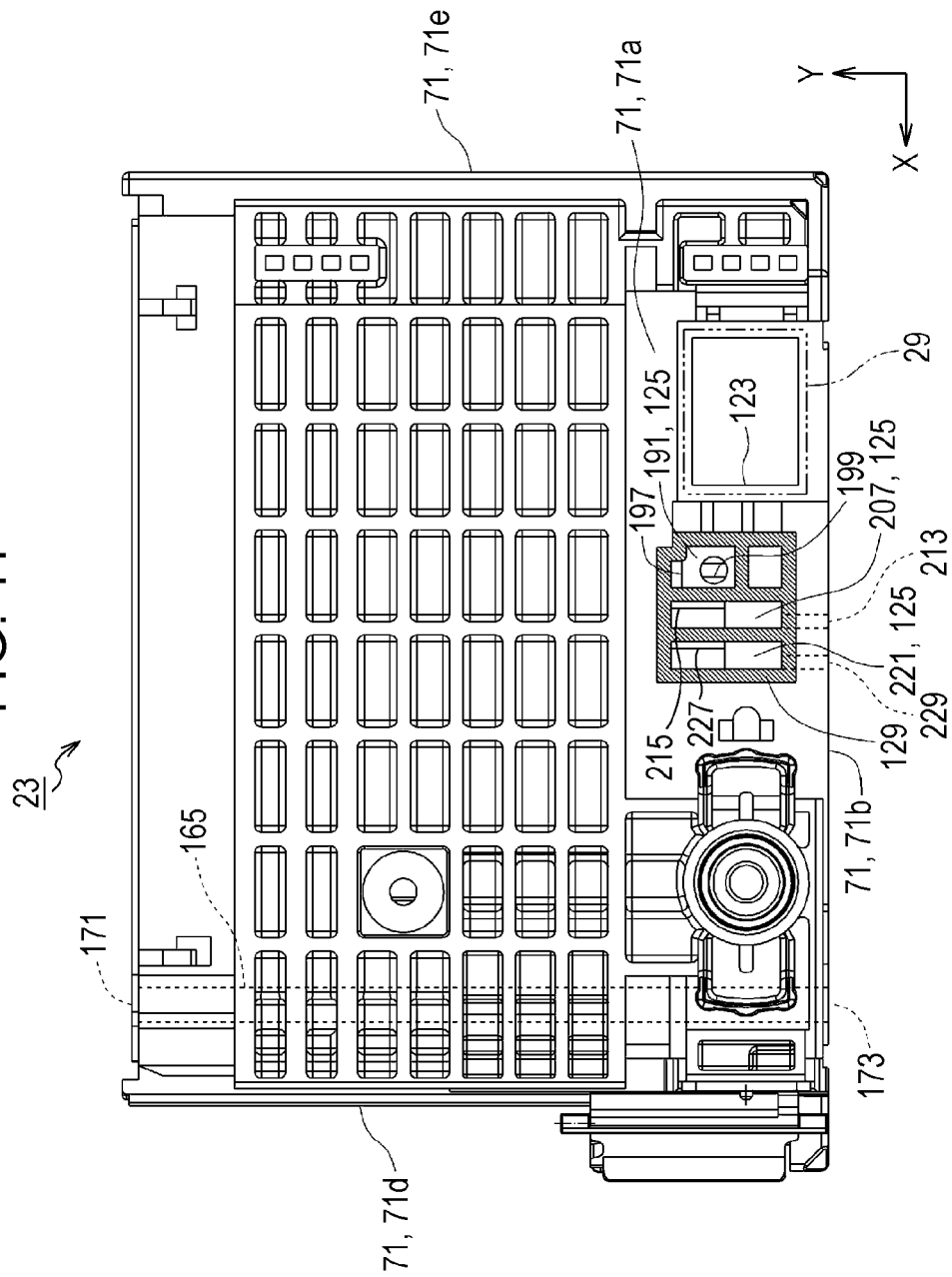
FIG. 11 is a bottom view illustrating the case in the embodiment.

The communication port 171 is open inside the second air chamber 84*b*. As illustrated in FIG. 11, the communication port 171 open inside the second air chamber 84*b* communicates with the second inner flow path 165. The second inner flow path 165 extends along the Y-axis direction in the case 23. The second inner flow path 165 leads to the second wall 71*b* after passing through the case 23 in the Y-axis direction starting from the communication port 171. As illustrated in FIG. 9, the communication port 173 is open in the second wall 71*b*. The second inner flow path 165 leads to the communication port 173. The communication port 173 is open toward the second wall 71*b*. the groove 105 connected to the communication port 173 communicates with the communication port 175 as the third surface flow path 167. The communication port 175 is open toward the second wall 71*b*. As illustrated in FIG. 8, the communication port 175 communicates with the third inner flow path 169. The third inner flow path 169 extends along the Y-axis direction in the case 23. The third inner flow path 169 leads to the communication port 177 after passing through the case 23 in the Y-axis direction starting from the communication port 175. As illustrated in FIG. 10, the communication port 177 communicates with the first containing chamber 85.

The communication port 181 is open inside the first containing chamber 85. As illustrated in FIG. 9, the communication port 181 open inside the first containing chamber 85 is also open toward the second wall 71b. The groove 105 connected to the communication port 181 communicates with the communication port 183 as the fourth surface flow path 179. The communication port 183 is open toward the second wall 71b. As illustrated in FIG. 10, the communication port 183 communicates with the second containing chamber 87.

The communication port 187 is open inside the second containing chamber 87. As illustrated in FIG. 9, the communication port 187 open inside the second containing chamber 87 is also open toward the second wall 71b. The groove 105 connected to the communication port 187 communicates with the communication port 189 as the fifth surface flow path 185. The communication port 189 is open toward the second wall 71b. As illustrated in FIG. 10, the communication port 189 communicates with the third containing chamber 89.

The communication port 197 is open inside the third containing chamber 89. As illustrated in FIG. 11, the communication port 197 open inside the third containing chamber 89 is also open toward the first wall 71a. The grooves 125 connected to the communication port 197 communicates with the communication port 199 as the first lower surface flow path 191. The communication port 199 is open toward the first wall 71a. As illustrated in FIG. 9, the communication port 199 communicates with the fourth inner flow path 193. The fourth inner flow path 193 extends along the Z-axis direction in the case 23. The fourth inner flow path 193 leads from the first wall 71a to the second wall 71b staring from the communication port 199. The communication port 201 is open toward the second wall 71b. The fourth inner flow path 193 leads from the first wall 71a to the communication port 201.

The groove 105 connected to the communication port 201 communicates with the communication port 203 as the sixth surface flow path 195. The communication port 203 is open toward the second wall 71b. As illustrated in FIG. 10, the communication port 203 communicates with the fourth containing chamber 93. The communication port 211 is open inside the fourth containing chamber 93. As illustrated in FIG. 9, the communication port 211 open inside the fourth containing chamber 93 is also open toward the second wall 71b. The grooves 105 connected to the communication port 211 communicates with the communication port 213 as the seventh surface flow path 205. As illustrated in FIG. 11, the communication port 213 communicates with the communication port 215 via the second lower surface flow path 207 configured of the grooves 125. The communication port 215 is open toward the first wall 71a. As illustrated in FIG. 10, the communication port 215 communicates with the first case inner flow path 209. The first case inner flow path 209 communicates with the communication port 217.

As illustrated in FIG. 9, the communication port 217 is open inside the valve chamber 101 on the second wall 71b. The valve hole 106 is open inside the valve chamber 101. As illustrated in FIG. 10, the valve hole 106 open inside the valve chamber 101 is also open toward the second inner wall 73b and communicates with the second case inner flow path 219. The second case inner flow path 219 communicates with the communication port 227. As illustrated in FIG. 11, the communication port 227 is open toward the first wall 71a. The communication port 227 communicates with the communication port 229 via the third lower surface flow path 221 configured of the grooves 125. As illustrated in FIG. 9, the communication port 229 is open toward the second wall 71b. The grooves 105 connected to the communication port 229 communicates with the communication port 231 as the eighth surface flow path 223. The communication port is open toward the second wall 71b. The communication port 231 communicates with the supply path 225. The supply path 225 extends in the Z-axis direction in the case 23 and communicates with the supply port 33.

As illustrated in FIG. 7, for example, the ink fills up to a liquid level ML1 that is a position of the liquid surface illustrated in a broken line when manufacturing the cartridge 10. In the embodiment, the liquid level ML1 is set inside the first containing chamber 85. As the ink in the cartridge 10 is consumed by the printer 1, the liquid level moves downstream, the air flows into the cartridge 10 from the upstream part of the flow path 100 via the air opening port 45. Then, as consumption of the ink proceeds, the liquid level is lowered down to a liquid level ML2 in the fourth containing chamber 93. At this time, the prism section 127 protrudes from the liquid level ML2. Then, the control unit 9 detects that the remaining amount of the ink in the cartridge 10 is run out or is decreased using the detection device 15. Then, the control unit 9 stops printing at a previous stage before the ink in the cartridge 10 is completely consumed and notifies the user that the ink is run out. In this way, it is possible to avoid driving the printing head in a state without the ink. If the printing head is driven in a state where the ink is empty, the air is mixed into the printing head and a problem may occur. In the embodiment, it is possible to avoid such a situation.

Method for Manufacturing Cartridge

A method for manufacturing the cartridge 10 will be described. In the embodiment, the method for manufacturing the cartridge 10 by re-injecting (refill processing) the ink in the cartridge 10 in which the ink is consumed and a remaining amount of the ink is at a predetermined value or less is described. In addition, the method for manufacturing the cartridge 10 described below can be also used as the method for the manufacturing the cartridge 10 by injecting the ink in the unused cartridge 10 prior to containing the ink.

Figure 12:
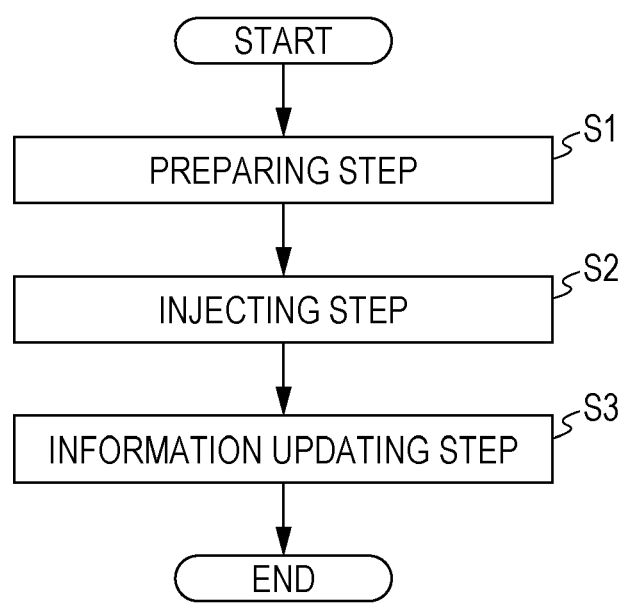
FIG. 12 is a flowchart illustrating flow of a method for manufacturing the cartridge in the embodiment.

As illustrated in FIG. 12, the method for manufacturing the cartridge 10 in the embodiment includes a preparing step S1 preparing the cartridge 10 described above, an injecting step S2 containing the ink in the containing section 81 by injecting the ink and an information updating step S3. In addition, in the embodiment, as a method for injecting the ink in the injecting step S2, a method for injecting the ink from the upstream part from the fourth containing chamber 93 in the flow path 100 leading from the air opening port 45 to the supply port 33 is employed.

The information updating step S3 is a step in which information of the ink consumption amount in a memory provided in the circuit substrate 40 of the cartridge 10 is rewritten as a usable value. When the ink is used and the remaining amount of the ink in the cartridge 10 is at a predetermined value or less, the information indicating the remaining amount of the ink which is at the predetermined value or less may be stored in the memory. In this case, the printer 1 determines that the ink is not present in the cartridge 10 and may not proceed to a normal printing operation. In the embodiment, in the information updating step S3, the information of the ink consumption amount in the memory is updated to the usable value indicating that the ink is at the predetermined value or more. In this way, when the cartridge 10 is mounted on the printer 1, the printer 1 proceeds to the normal printing operation. In addition, the step S3 may be omitted.

Figure 13:
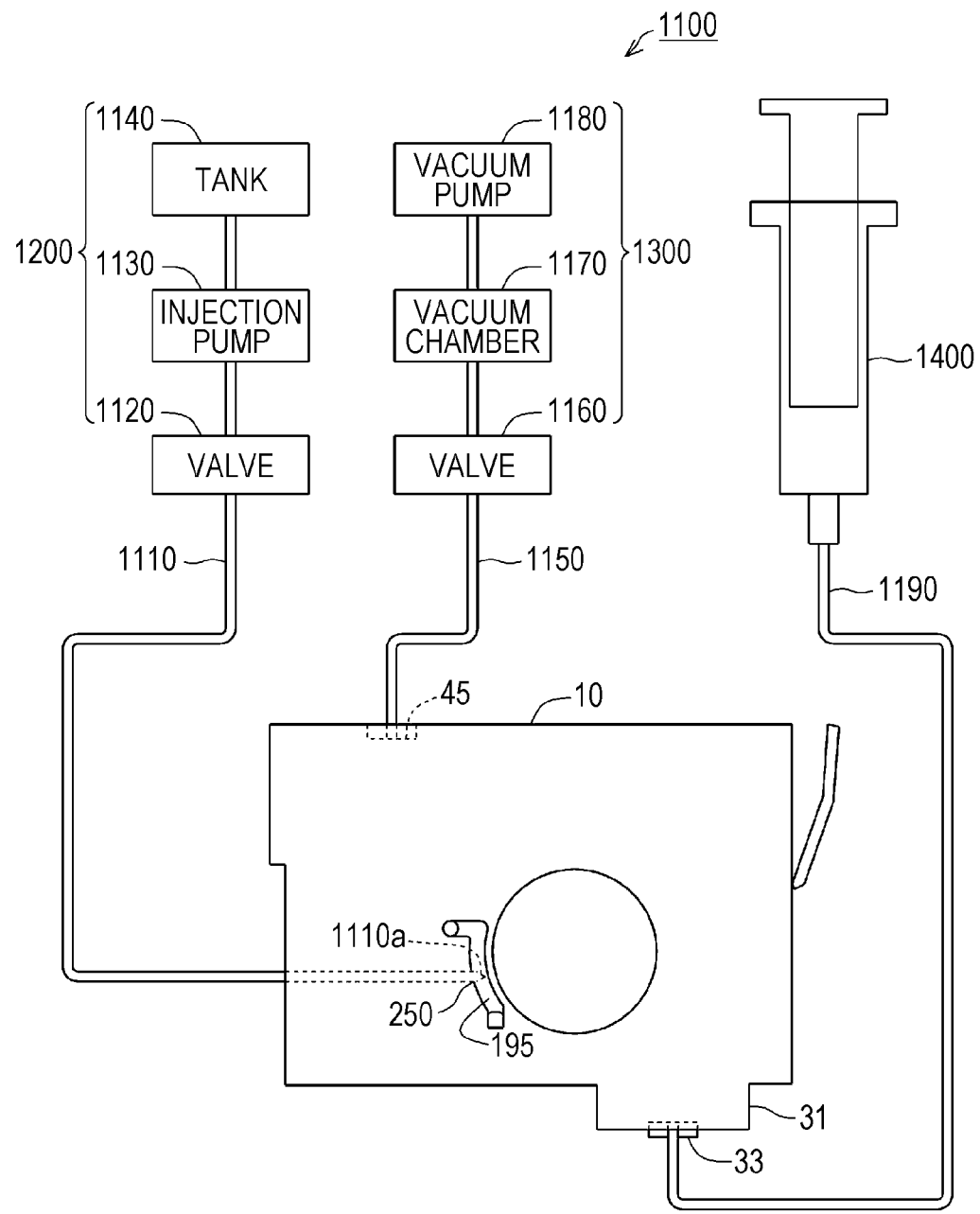
FIG. 13 is a view illustrating a schematic configuration of an injection system in the embodiment.

For example, an injection system 1100 illustrated in FIG. 13 may be used for injecting the ink in the injecting step S2.

The injection system 1100 includes an injection device 1200, a vacuum device 1300 and a suction device 1400. The injection device 1200 includes a tube 1110, a valve 1120, an injection pump 1130 and a tank 1140. The valve 1120 is disposed at the upstream part from the tube 1110. The injection pump 1130 of the injection device 1200 is disposed at the upstream part of the injection device 1200 from the valve 1120 of the injection device 1200. The tank 1140 is disposed at the upstream part from the injection pump 1130. For example, the tube 1110 can be a needle-shaped tube. A tip portion 1110a of the tube 1110 is open and the ink can be flowed out from the tip portion 1110a. FIG. 13 schematically illustrates a state of injection of the ink from the sixth surface flow path 195. The vacuum device 1300 includes a tube 1150, a valve 1160, a vacuum chamber 1170 and vacuum pump 1180. The valve 1160 is disposed at the upstream part from the tube 1150. The vacuum chamber 1170 is disposed at the upstream part from the valve 1160. The vacuum pump 1180 is disposed at the upstream part from the vacuum chamber 1170. For example, the tube 1150 can be a needle-shaped tube. The syringe-shaped suction device 1400 includes a tube 1190. The tube 1190 has a needle shape, is inserted into the supply port 33, and then pushes up the spring seat 119.

Figure 14:
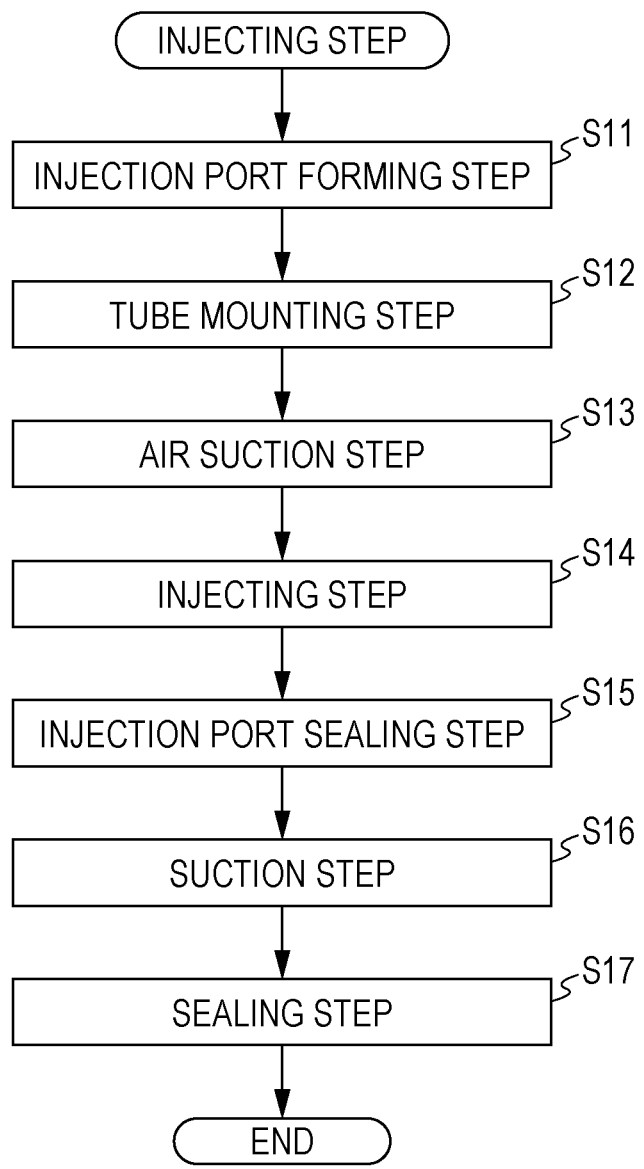
FIG. 14 is a flowchart illustrating flow of injection process in the embodiment.

As illustrated in FIG. 14, the injecting step S2 includes an injection port forming step S11, a tube mounting step S12, an air suction step S13, an injecting step S14, an injection port sealing step S15, a suction step S16 and a sealing step S17. In the injection port forming step S11, an injection port 250 for injecting the ink into the cartridge 10 is formed in the cartridge 10. The injection port 250 is formed by opening a hole on a wall which configures a flow path of the upstream part from the fourth containing chamber 93 in the flow path 100 of the cartridge 10. The injection port 250 may be provided on a wall which configures a predetermined portion in which the ink is directly injected thereto. For example, when the ink is injected from the sixth surface flow path 195 (FIG. 9), the injection port 250 is formed by opening the hole on the wall which configures the sixth surface flow path 195. Herein, one of the walls configuring the sixth surface flow path 195 is the film 21 (FIG. 2B). In addition, another wall configuring the sixth surface flow path 195 is the second inner wall 73b (FIG. 5A). For example, the injection port 250 may be formed by opening the hole on the wall using a drill. In addition, for example, the injection port 250 may be also formed by piercing the tube 1110 on the wall and opening the hole thereto.

As described above, the injection port 250 can be formed by opening the hole on the wall configuring the flow path 100. In addition, the ink can be injected into the cartridge 10 via the injection port 250 by forming the injection port 250. In addition, the injection port 250 can be easily formed by opening the hole in the film 21, the film 57, the film 61, the label 59 or the like among the walls configuring the flow path 100.

In the tube mounting step S12, the tube 1110 is mounted on the injection port 250. In addition, when the tube 1110 is directly pierced to the forming wall, the injection port forming step S11 and the tube mounting step S12 are carried out simultaneously.

In the air suction step S13, the air in the cartridge 10 is sucked from the air opening port 45 by the vacuum device 1300 mounted on the air opening port 45. At this time, the air in the cartridge 10 is sucked from the air opening port 45 by changing the valve 1160 (FIG. 13) from the closed state to the open state after the inside of the valve 1170 is sufficiently depressurized by operating the vacuum pump 1180. In this way, the inside of the flow path 100 of the cartridge 10 is depressurized. In addition, as a mounting time of the vacuum device 1300 to the air opening port 45, the mounting can be performed at any timing as long as the air suction step S13 is yet to be started.

In the injecting step S14 illustrated in FIG. 14, the ink is injected from the injection port 250 of the cartridge 10 into the cartridge 10. In the injecting step S14, in a state where the air suction from the air opening port 45 (FIG. 13) is maintained, the injection pump 1130 is driven and the valve 1120 is opened. Therefore, the ink in the tank 1140 is injected from the injection port 250 of the cartridge 10. When a predetermined amount of the ink is contained in the containing section 81, the driving of the injection device 1200 is stopped. Therefore, the ink injection is stopped. At this time, the driving of the vacuum device 1300 is also stopped. Then, the injection device 1200 and the vacuum device 1300 are removed away from the cartridge 10.

In the injection port sealing step S15, the injection port 250 is sealed. For example, the injection port 250 may be sealed by a member having elasticity such as film or rubber. Therefore, it is possible to reduce the possibility of outflow of the ink contained in the cartridge 10 to the outside through the injection port 250.

In the suction step S16, the suction device 1400 illustrated in FIG. 13 is driven. When sucking the inside of the cartridge 10 from the air opening port 45 with the vacuum device 1300, the valve unit 51 becomes a closed state. Thus, the ink is not introduced to the downstream part from the valve unit 51. Accordingly, in the suction step S16 illustrated in FIG. 14, the air in the flow path 100 is sucked from the supply port 33. Therefore, the valve unit 51 is opened and the ink is introduced from the upstream part of the flow path 100 to the downstream part of the flow path 100 via the valve unit 51.

In the sealing step S17, the air opening port 45 is sealed with the film 47 and the supply port 33 is sealed with the film 35. Therefore, the injecting step S2 is finished.

By doing so, the cartridge 10 may be manufactured. In the embodiment, the ink is injected into the containing section 81 from the injection port 250 which is formed in the sixth surface flow path 195 at the upstream part from the fourth containing chamber 93 in which the detection member 29 is provided. Accordingly, it is easy to avoid mixing of the air bubbles into the fourth containing chamber 93 when the ink is injected. Thus, it is easy to suppress adhering of the air bubbles to the detection member 29. Accordingly, it is easy to avoid deterioration of the accuracy in detecting the ink amount.

Herein, as illustrated in FIG. 9, the sixth surface flow path 195 has a bending section 251. The bending section 251 is positioned between the communication port 201 and the communication port 203. Then, in the embodiment, the injection port 250 is formed between the communication port 201 and the bending section 251. Thus, the ink injected from the injection port 250 reaches the inside of the fourth containing chamber 93 via the communication port 203 passing through the bending section 251. At this time, in a case where the air bubbles are mixed into the injected ink, when the ink passes through the bending section 251, the air bubbles are easy to be caught in the bending section 251. Therefore, it is easier to avoid mixing of the air bubbles into the fourth containing chamber 93.

In addition, a forming position of the injection port 250 is not limited to the sixth surface flow path 195. As the forming position of the injection port 250, for example, the first lower surface flow path 191 may be also employed. In this case, a method for forming the injection port 250 on the film 57 may be employed. In the embodiment, the film 57 has light transmission. If the ink is injected from the first lower surface flow path 191 via the injection port 250 formed on the film 57, the state of injection of the ink can be visually recognized via the detection member 29 when the ink is injected.

In addition, for example, as a forming position of the injection port 250, the third containing chamber 89 may be also employed. In this case, a method for forming the injection port 250 on the film 65, a method for forming the injection port 250 on the second wall 71b, a method for forming the injection port 250 on the fifth wall 71e, a method for forming the injection port 250 on the first wall 71a or the like may be employed. The third containing chamber 89 has the largest volume among the first containing chamber 85, the second containing chamber 87, the third containing chamber 89 and the fourth containing chamber 93. Thus, if the ink is injected from the third containing chamber 89 via the injection port 250 formed in the third containing chamber 89, the ink can be effectively injected into the containing section 81.

In addition, when the injection port 250 is formed in the third containing chamber 89, a method for forming the injection port 250 outside a region overlapping the fourth containing chamber 93 may be employed in the third containing chamber 89. According to the method, when the ink is injected from the third containing chamber 89, the ink can be injected so as to avoid the region overlapping the fourth containing chamber 93. Therefore, when the ink is injected, it is easy to avoid the damage to the fourth containing chamber 93.

In addition, for example, as the forming position of the injection port 250, the fifth surface flow path 185 may be also employed. In this case, a method for forming the injection port 250 on the film 21, a method for forming the injection port 250 on the fifth wall 71e or the like may be employed. The fifth surface flow path 185 is a flow path which communicates between the second containing chamber 87 and the third containing chamber 89. Therefore, if the ink is injected from the fifth surface flow path 185, it is possible to inject the ink to both the third containing chamber 89 and the second containing chamber 87 at the same time.

In addition, when forming the injection port 250 in the fifth surface flow path 185, if a method for forming the injection port 250 on the film 21 is employed, it is possible to avoid forming of the injection port 250 in the case 23.

In addition, for example, as the forming position of the injection port 250, the second containing chamber 87 may be also employed. In this case, a method for forming the injection port 250 on the film 65, a method for forming the injection port 250 on the second wall 71b, a method for forming the injection port 250 on the fifth wall 71e, a method for forming the injection port 250 on the third wall 71c or the like may be employed. If the injection port 250 is formed in the second containing chamber 87, the ink can be injected from the second containing chamber 87 between the first containing chamber 85 and the third containing chamber 89. Accordingly, the ink can be effectively injected into both the first containing chamber 85 and the third containing chamber 89.

In addition, for example, as the forming position of the injection port 250, the fourth surface flow path 179 may be also employed. The fourth surface flow path 179 is a flow path which communicates between the second containing chamber 87 and the first containing chamber 85. Thus, if the ink is injected from the fourth surface flow path 179, it is possible to inject the ink to both the second containing chamber 87 and the first containing chamber 85 at the same time.

In addition, for example, as the forming position of the injection port 250, the first containing chamber 85 may be also employed. In this case, a method for forming the injection port 250 on the film 65, a method for forming the injection port 250 on the second wall 71b, a method for forming the injection port 250 on the third wall 71c or the like may be employed. Furthermore, as the method for forming the injection port 250 on the third wall 71c, a method for forming the injection port 250 between the rib 95 and the third partition plate 75c may be employed. According to the method, since the injection port 250 is formed between the third partition plate 75c and the rib 95, it is possible to reduce the deflection caused in the case 23 when forming the injection port 250.

In addition, as the method for forming the injection port 250 on the third wall 71c, a method for forming the injection port 250 between the rib 95 and the first partition plate 75a may be employed. According to the method, since the ink can be injected into the first containing chamber 85 from a side opposite to the communication port 181 side of the rib 95, it is easy to capture the air bubbles with the rib 95 even though the air bubbles are mixed into the injected ink. Therefore, it is easier to avoid mixing of the air bubbles into the fourth containing chamber 93.

In addition, for example, as the forming position of the injection port 250, the upstream part from the first containing chamber 85 may be also employed. Since the ink can be injected into the containing section 81 from the upstream part from the first containing chamber 85, the air bubbles are difficult to reach the fourth containing chamber 93 even though the air bubbles are mixed into the injected ink.

In addition, for example, as the forming position of the injection port 250, the second surface flow path 159 may be also employed. In this case, the method for forming the injection port 250 on the film 21 may be employed. According to the method, it is possible to avoid forming of the injection port 250 in the case 23.

In addition, for example, as the forming position of the injection port 250, the first surface flow path 151 may be also employed. In this case, the method for forming the injection port 250 on the film 21 may be employed. According to the method, it is possible to avoid forming of the injection port 250 in the case 23.

In addition, for example, as the forming position of the injection port 250, the first air chamber 84a may be also employed. In this case, the method for forming the injection port 250 on the film 65, the method for forming the injection port 250 on the second wall 71b, the method for forming the injection port 250 on the third wall 71c, the method for forming the injection port 250 on the fourth wall 71d or the like may be employed. If the injection port 250 is formed in the first air chamber 84a, the ink can be injected from the first air chamber 84a at the upstream part from the first containing chamber 85 into the containing section 81. Accordingly, the air bubbles are further difficult to reach the fourth containing chamber 93 even though the air bubbles are mixed into the injected ink.

In addition, for example, as the forming position of the injection port 250, a region at the upstream part from the first containing chamber 85 and the downstream part from the first air chamber 84a may be also employed. Therefore, since the ink can be injected from the upstream part from the first containing chamber 85 into the containing section 81, the air bubbles are difficult to reach the fourth containing chamber 93 even though the air bubbles are mixed into the injected ink.

In addition, for example, as the forming position of the injection port 250, the third surface flow path 167 may be also employed. In this case, the method for forming the injection port 250 on the film 21 may be employed. According to the method, it is possible to avoid forming of the injection port 250 in the case 23.

In addition, for example, as the forming position of the injection port 250, the second air chamber 84b may be also employed. In this case, the method for forming the injection port 250 on the film 65, the method for forming the injection port 250 on the first wall 71a, the method for forming the injection port 250 on the second wall 71b, the method for forming the injection port 250 on the fourth wall 71d or the like may be employed. If the injection port 250 is formed in the second air chamber 84b, the ink can be injected from the second air chamber 84b at the upstream part from the first containing chamber 85 into the containing section 81. Accordingly, the air bubbles are further difficult to reach the fourth containing chamber 93 even though the air bubbles are mixed into the injected ink.

In addition, in the embodiment, as the detection member 29, an optical member having the prism section 127 is employed. However, the detection member 29 is not limited to the member and as long as the member is used for detecting the state of the remaining amount of the ink of the cartridge 10, various members may be employed. As the detection member 29, for example, a piezoelectric element or the like may be also employed.

In the above described embodiment, the film 61 corresponds to a first sheet member, the film 57 corresponds to a second sheet member, and the film 21 corresponds to a third sheet member. In addition, the first wall 71a corresponds to a first outer wall and the second wall 71b corresponds to a second outer wall. In addition, the first lower surface flow path 191 corresponds to a first outer wall flow path, the fifth surface flow path 185 corresponds to a second outer wall flow path, the fourth surface flow path 179 corresponds to a third outer wall flow path, the second surface flow path 159 corresponds to a fourth outer wall flow path and the third surface flow path 167 corresponds to a fifth outer wall flow path. In addition, the bending section 251 corresponds to a bending section, the third partition plate 75c corresponds to a partition wall, the air opening port 45 corresponds to an air opening hole, the first air chamber 84a corresponds to an air communication chamber and the second air chamber 84b corresponds to a second air communication chamber.

As described above, according to the embodiment, it is easy to avoid mixing of the air bubbles into the fourth containing chamber 93 when the ink is injected. If the air bubbles are mixed into the fourth containing chamber 93, the air bubbles mixed into the fourth containing chamber 93 may reach the printing head. If the air bubbles reach the inside of the printing head, ejecting function of the ink in the printing head may be deteriorated. In other words, if the air bubbles are mixed into the fourth containing chamber 93, there is a problem that the ejecting function of the ink may be deteriorated.

If the ink is injected from the downstream part from the fourth containing chamber 93 including the fourth containing chamber 93 into the containing section 81, the air bubbles are easy to be mixed into the downstream part from the fourth containing chamber 93. The supply port 33 is provided on the downstream part from the fourth containing chamber 93. In other words, the downstream part from the fourth containing chamber 93 is nearer to the printing head than the upstream part from the fourth containing chamber 93. Thus, if the air bubbles are mixed into the downstream part from the fourth containing chamber 93, the mixed air bubbles are easy to reach the printing head. Accordingly, from a viewpoint of easy way in avoiding the air bubbles to reach the printing head, it is preferable that the ink be injected from the upstream part from the fourth containing chamber 93 into the containing section 81.

Figure 15:
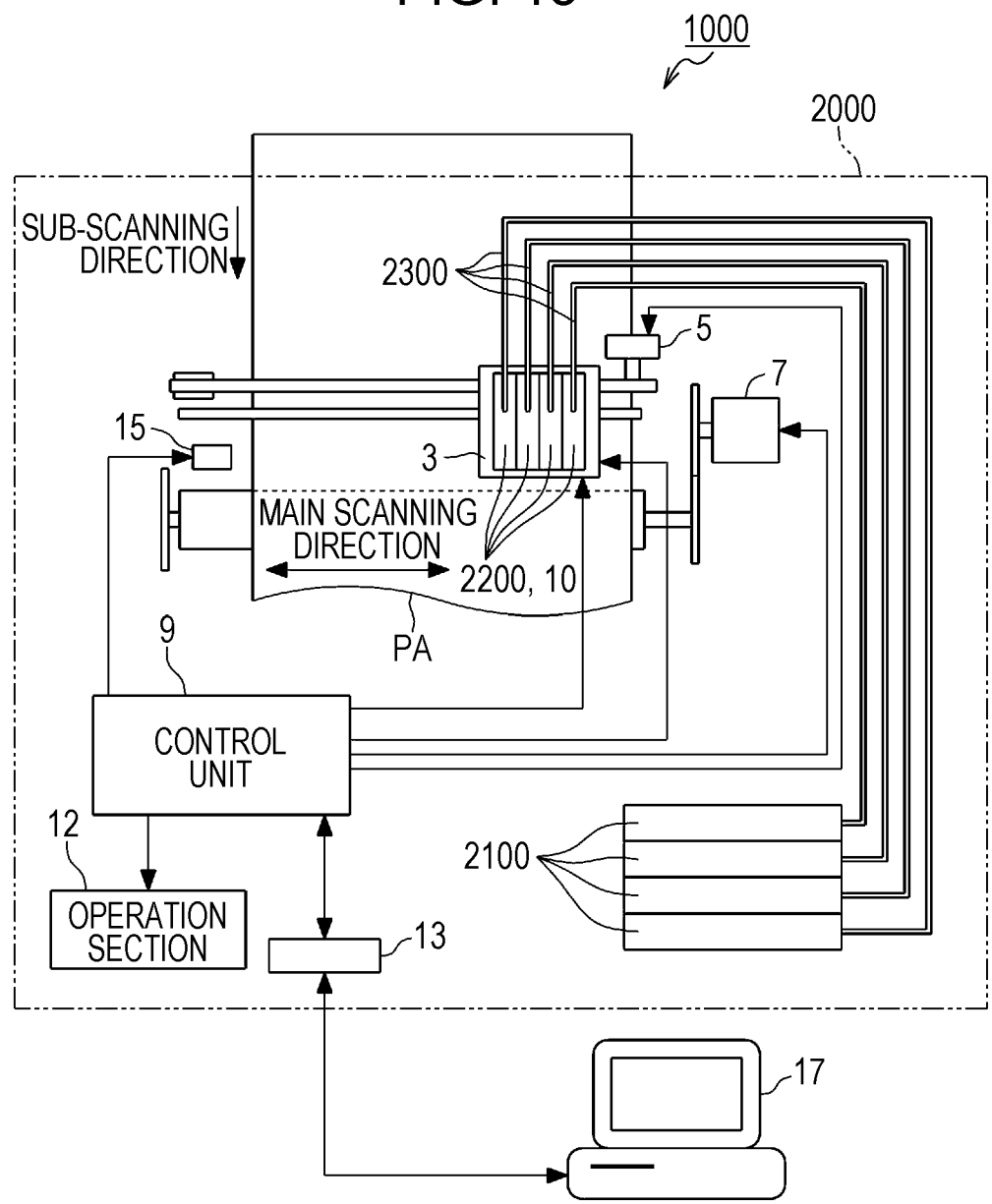
FIG. 15 is a view illustrating another example of a printer in the embodiment.

In the printer 1 in the embodiment, when the remaining amount of the ink contained in the cartridge 10 is decreased or run out, it is replaced with a new cartridge 10 having a sufficient remaining amount. However, the form of the printer 1 is not limited to the embodiment. As the form of the printer 1, a form to supply the ink to the printing head from a tank having a containing amount of the ink larger than the cartridge 10 may be employed. As illustrated in FIG. 15, a printer 2000 having the above described form has a tank 2100 and a relay unit 2200. The tank 2100 stores the ink. The ink in the tank 2100 is supplied to the relay unit 2200 via a tube 2300. The relay unit 2200 is installed in the holder 3. The relay unit 2200 is detachably mounted in the holder 3. In the printer 2000, as the relay unit 2200, the above described cartridge 10 is employed.

The ink in the tank 2100 is supplied to the relay unit 2200 via the tube 2300. The ink supplied to the relay unit 2200 is supplied to the printing head (not illustrated) provided in the holder 3. In other words, the relay unit 2200 has a function to relay the ink in the tank 2100 to the printing head. Then, when the remaining amount of the ink in the tank 2100 is decreased or run out, the user can replenish the ink into the tank 2100. The tank 2100 has an injection port (not illustrated). The user replenishes the ink into the tank 2100 from the injection port.

Figure 16A:
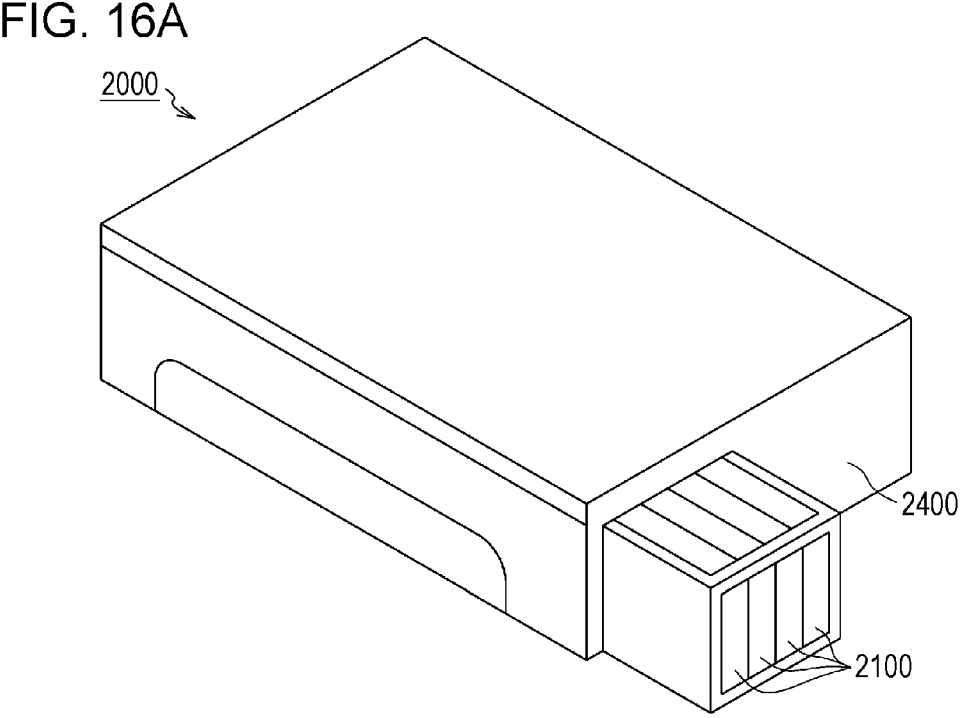
FIGS. 16A and 16B are perspective views illustrating exteriors of another example of the printer in the embodiment.
Figure 16B:
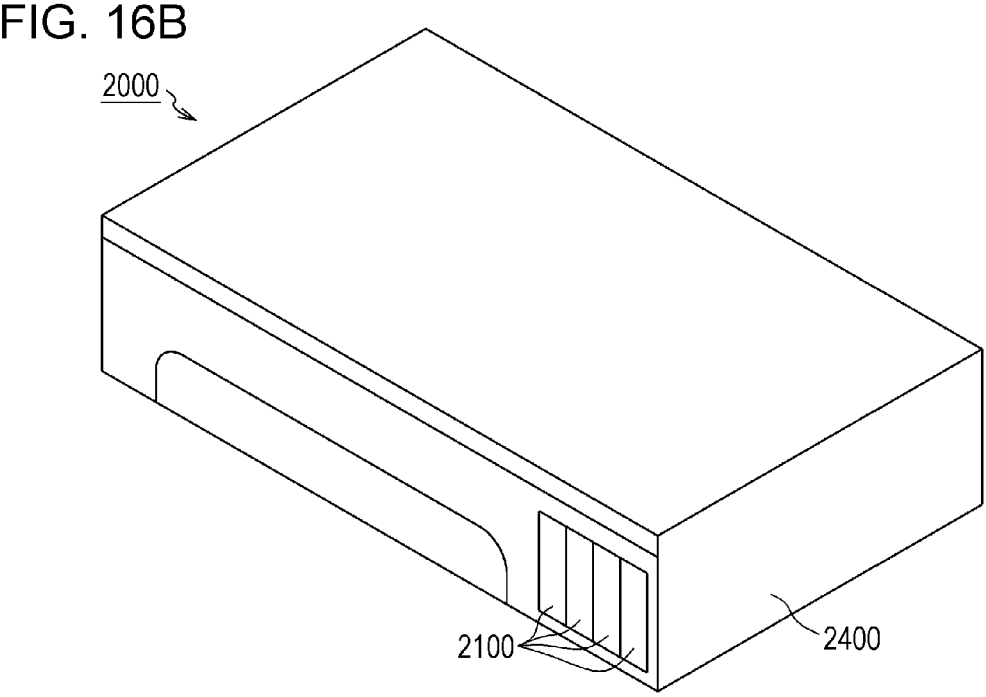

In addition, as illustrated in FIG. 16A, as the printer 2000, a form in which the tank 2100 is attached to outside of a sheathing case (a housing) 2400 of the printer 1 may be employed. The form in which the tank 2100 is attached to the outside of the sheathing case 2400 is referred to as an external form of the tank 2100. In addition, as illustrated in FIG. 16B, as the printer 2000, a form in which the tank 2100 mounted inside the sheathing case 2400 of the printer 1 may be also employed. The form in which the tank 2100 is mounted inside the sheathing case 2400 is referred to as a built-in form of the tank 2100.

Figure 17:
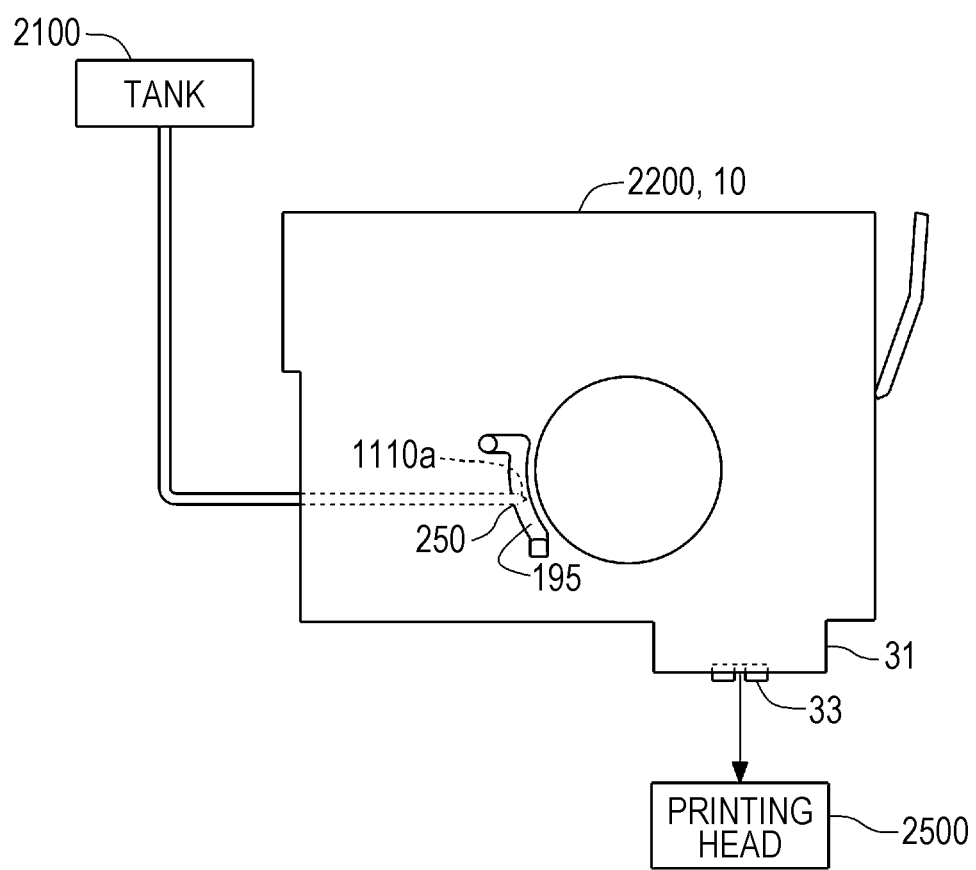
FIG. 17 is a view describing flow of an ink in another example of the printer in the embodiment.

As illustrated in FIG. 17, the ink in the tank 2100 is supplied from the injection port 250 of the cartridge 10 as the relay unit 2200 to the inside of the containing section 81 via the tube 2300. The ink supplied to the containing section 81 is supplied from the supply port 33 to a printing head 2500. Also in the printer 2000, the injection port 250 of the cartridge 10 is formed on the upstream part from the fourth containing chamber 93. Accordingly, also in the printer 2000, the same effects as the printer 1 can be achieved. The injection port 250 of the cartridge 10 is formed at various positions described above if the positions are at the upstream part from the fourth containing chamber 93.

The invention is not limited to the ink jet printer and ink cartridge thereof, and can be applied to any liquid ejecting apparatus which consumes liquid other than the ink, and any liquid container which is used in those liquid ejecting apparatus. For example, the invention may be applied to the liquid container which is used in various liquid ejecting apparatuses described below.

(1) an image recording apparatus such as a facsimile apparatus, (2) a color material ejecting apparatus which is used for manufacturing a color filter of an image display apparatus such as a liquid crystal display, (3) an electrode material ejecting apparatus which is used for forming the electrode such as organic electro luminescence (EL) display or field emission display (FED), (4) a liquid ejecting apparatus which ejects the liquid including bio-organic material used for manufacturing a bio-chip, (5) a sample ejecting apparatus as a accuracy pipette, (6) an ejecting apparatus of lubricant, (7) an ejecting apparatus of resin liquid, (8) a liquid ejecting apparatus which ejects lubricant with a pinpoint to an accuracy machine such as a watch or a camera, (9) a liquid ejecting apparatus which ejects transparent resin liquid such as ultraviolet curing resin solution onto a substrate in order to form a minute hemispherical lens (an optical lens) or the like used for an optical communication element or the like, (10) a liquid ejecting apparatus which ejects acidic or alkaline etching solution in order to etch a substrate or the like and (11) a liquid ejecting apparatus including a liquid consuming head which ejects small amounts of any other liquid droplets.

In addition, the "liquid droplets" indicate the state of liquid ejected from a liquid ejecting apparatus and include liquids trailing in granular shape, tear shape and thread shape. In addition, the "liquid" referred to herein may be a material which can be consumed by a liquid ejecting apparatus. For example, the "liquid" may be a material in the state in which the material is of liquid phase. In addition, the "liquid" includes liquid material having high or low viscosity and a liquid material such as sol, gel water, other inorganic solvent, organic solvent, solution, liquid-phased resin, or liquid-phased metal (metallic melt). In addition, the "liquid" is not only a liquid as one state of a material but also includes a material in which particles of functional material consisted of solids such as pigments or metal particles are dissolved, dispersed or mixed in a solvent. The above described "liquid" can be also expressed as a "liquid body". As a representative example of the liquid or the liquid body, the ink, liquid crystal or the like described in the above embodiment can be exemplified. Herein, the ink is intended to include various types of liquid compositions such as general water-based ink, oil-based ink, gel ink and hot melt ink.

What is claimed is:

1. A method for manufacturing a liquid container, the liquid container including:
    a case having a containing section for containing liquid;
    a supply port for supplying the liquid from the containing section to the outside thereof; and
    a detection member for detecting an amount of the liquid in the containing section,
    wherein the containing section is divided into a first containing chamber, a second containing chamber, a third containing chamber and a fourth containing chamber in a flow of the liquid from the containing section to the supply port,
    the first containing chamber which is provided for containing the liquid,
    the second containing chamber which is provided on a downstream part of the flow from the first containing chamber and communicates with the first containing chamber,
    the third containing chamber which is provided on a downstream part of the flow from the second containing chamber and communicates with the second containing chamber, and
    the fourth containing chamber which is provided on a downstream part of the flow from the third containing chamber and communicates with the third containing chamber, the fourth containing chamber being partitioned from the third containing chamber with a first sheet member, the detection member being located in the fourth containing chamber,
    the method comprising:
    forming an injection port on an upstream part of the flow from the fourth containing chamber, the injection port being communicated with the inside of the containing section; and
    injecting the liquid from the injection port.

2. The method for manufacturing a liquid container according to claim 1,
    the case including a first outer wall, an opening section being formed in a first outer wall of the case, the opening section being opened from the outside of the case toward the inside of the fourth containing chamber,
    the detection member having light transmission property and protruding from the opening section into the fourth containing chamber in a state where the opening section is covered by the detection member from the outside of the case,
    a flow path communicating between the third containing chamber and the fourth containing chamber, the flow path including a first outer wall flow path which is provided on the first outer wall, the first outer wall flow path being sealed from the outside of the case with a second sheet member having the light transmission property,
    wherein forming the injection port includes forming the injection port in the second sheet member in the first outer wall flow path.

3. The method for manufacturing a liquid container according to claim 2,
    a bending section being provided in the flow path, the bending section communicating between the first outer wall flow path and the fourth containing chamber,
    wherein forming the injection port including forming the injection port between the first outer wall flow path and the bending section.

4. The method for manufacturing a liquid container according to claim 1,
    the third containing chamber having the largest volume among the first containing chamber, the second containing chamber, the third containing chamber and the fourth containing chamber,
    wherein forming the injection port including forming the injection port in the third containing chamber.

5. The method for manufacturing a liquid container according to claim 4,
    wherein forming the injection port including forming the injection port in the outside of a region overlapping the fourth containing chamber.

6. The method for manufacturing a liquid container according to claim 1,
    wherein forming the injection port including forming the injection port in a flow path communicating between the third containing chamber and the second containing chamber.

7. The method for manufacturing a liquid container according to claim 6,
    the flow path including a second outer wall flow path that is provided on the second outer wall of the case, the second outer wall flow path being sealed from the outside of the liquid container with a third sheet member,
    wherein forming the injection port including forming the injection port in the third sheet member.

8. The method for manufacturing a liquid container according to claim 1,
    wherein forming the injection port including forming the injection port in the second containing chamber.

9. The method for manufacturing a liquid container according to claim 1,
    a flow path communicating between the second containing chamber and the first containing chamber, the flow path including a third outer wall flow path provided on the second outer wall of the case, the third outer wall flow path being sealed with the third sheet member,
    wherein forming the injection port including forming the injection port in the third sheet member.

10. The method for manufacturing a liquid container according to claim 1,
the containing section including: a partition wall which partitions the second containing chamber and the first containing chamber; and a rib which is opposite to the partition wall in a position spaced apart from the partition wall in the first containing chamber,
wherein forming the injection port including forming the injection port between the partition wall and the rib.

11. The method for manufacturing a liquid container according to claim 1,
the containing section including: a partition wall which partitions the second containing chamber and the first containing chamber; and a rib which is opposite to the partition wall in a position spaced apart from the partition wall in the first containing chamber,
wherein forming the injection port including forming the injection port in a side of the rib opposite to the partition wall.

12. The method for manufacturing a liquid container according to claim 1,
the case including: an air communication chamber which makes the first containing chamber communicate with the outside of the case via an air opening hole provided in the case, the air communication chamber being provided on an upstream part of the flow from the first containing chamber,
wherein forming the injection port including forming the injection port on the upstream part of the flow from the first containing chamber.

13. The method for manufacturing a liquid container according to claim 12,
a flow path communicating between the air communication chamber and the first containing chamber, the flow path including a fourth outer wall flow path that is provided on the second outer wall of the case, the fourth outer wall flow path being sealed with the third sheet member,
wherein forming the injection port including forming the injection port in the third sheet member.

14. The method for manufacturing a liquid container according to claim 12,
wherein forming the injection port including forming the injection port in the air communication chamber.

15. The method for manufacturing a liquid container according to claim 12,
the case including: a second air communication chamber communicating respectively with the fourth outer wall flow path and the first containing chamber, the second air communication chamber being provided between the fourth outer wall flow path and the first containing chamber,
wherein forming the injection port including forming the injection port on the upstream part of the flow from the first containing chamber and the downstream part of the flow from the fourth outer wall flow path.

16. The method for manufacturing a liquid container according to claim 15,
a flow path communicating between the second air communication chamber and the first containing chamber, the flow path including a fifth outer wall flow path provided on the second outer wall of the case, the fifth outer wall flow path being sealed with the third sheet section,
wherein forming the injection port including forming the injection port in the third sheet member.

17. The method for manufacturing a liquid container according to claim 15,
wherein forming the injection port including forming the injection port in the second air communication chamber.

* * * * *